US012564481B2

(12) United States Patent
Schnitzspan

(10) Patent No.: US 12,564,481 B2
(45) Date of Patent: Mar. 3, 2026

(54) PATIENT INDIVIDUAL PHYSICAL TRANSFER KEY

(71) Applicant: EXOCAD GMBH, Darmstadt (DE)

(72) Inventor: Paul Schnitzspan, Darmstadt (DE)

(73) Assignee: EXOCAD GMBH, Darmstadt (DE)

( * ) Notice: Subject to any disclaimer, the term of this patent is extended or adjusted under 35 U.S.C. 154(b) by 482 days.

(21) Appl. No.: 18/028,115

(22) PCT Filed: Oct. 1, 2020

(86) PCT No.: PCT/EP2020/077530
§ 371 (c)(1),
(2) Date: Mar. 23, 2023

(87) PCT Pub. No.: WO2022/069048
PCT Pub. Date: Apr. 7, 2022

(65) Prior Publication Data
US 2023/0372070 A1 Nov. 23, 2023

(51) Int. Cl.
*A61C 11/00* (2006.01)
*A61C 13/00* (2006.01)
*B33Y 10/00* (2015.01)
*B33Y 30/00* (2015.01)
*B33Y 80/00* (2015.01)

(52) U.S. Cl.
CPC .......... *A61C 11/00* (2013.01); *A61C 13/0004* (2013.01); *B33Y 10/00* (2014.12); *B33Y 30/00* (2014.12); *B33Y 80/00* (2014.12)

(58) Field of Classification Search
CPC ..... A61C 11/00; A61C 13/0004; B33Y 10/00; B33Y 30/00; B33Y 80/00

USPC .......................................................... 433/54
See application file for complete search history.

(56) References Cited

U.S. PATENT DOCUMENTS

| | | | |
|---|---|---|---|
| 11,432,919 B2 * | 9/2022 | Stipek, Sr. ........... | A61C 19/045 |
| 2018/0110603 A1 * | 4/2018 | Stipek, Sr. ............. | A61C 11/06 |
| 2019/0290408 A1 * | 9/2019 | Fisker ..................... | A61C 11/00 |
| 2020/0113663 A1 * | 4/2020 | Fang ...................... | A61C 19/05 |

(Continued)

FOREIGN PATENT DOCUMENTS

| | | | | |
|---|---|---|---|---|
| DE | 102017131134 B4 * | 11/2023 | ............. | A61C 19/05 |
| EP | 3705079 A1 * | 9/2020 | ............. | G06F 30/17 |

(Continued)

OTHER PUBLICATIONS

Oelschlager, Holger, "International Search Report", mailed Jun. 10, 2021, issued in the corresponding PCT Application No. PCT/EP2020/077530, filed Oct. 1, 2020.

*Primary Examiner* — Matthew M Nelson
(74) *Attorney, Agent, or Firm* — PERRY + CURRIER INC.

(57) ABSTRACT

The invention relates to a method for configuring a patient individual physical transfer key for transferring a virtually defined first position of a three-dimensional virtual representation of a physical model of a patients dentition within a 3D virtual representation of a physical articulator to the physical model of the patients dentition and the physical articulator. A 3D virtual representation of the physical transfer key is generated and provided for generating the physical transfer key. The transfer key is configured to be connected to a first support section of the articulator and to support a first one of the 3D virtual representations of the model components of the dentition model at the first position.

9 Claims, 27 Drawing Sheets

(56) References Cited

U.S. PATENT DOCUMENTS

| | | | | |
|---|---|---|---|---|
| 2020/0268495 A1* | 8/2020 | Ryakhovsky | .......... | A61C 13/34 |
| 2022/0079722 A1* | 3/2022 | Rößler | .................. | G16H 20/40 |
| 2022/0168076 A1* | 6/2022 | Mack | .................... | B33Y 50/00 |
| 2023/0069231 A1* | 3/2023 | Gerth | .................... | A61C 13/10 |
| 2023/0372070 A1* | 11/2023 | Schnitzspan | .......... | B33Y 80/00 |

FOREIGN PATENT DOCUMENTS

| | | | | | |
|---|---|---|---|---|---|
| WO | WO-2013050536 A1 * | 4/2013 | .......... | A61C 9/0053 |
| WO | WO-2022069048 A1 * | 4/2022 | ......... | A61C 13/0004 |

* cited by examiner

| Providing virtual representation of articulator | 200 |
| Providing virtual representation of dentition model | 202 |
| Arranging virtual representation of dentition model | 204 |
| Generating virtual representation of transfer key | 206 |
| Providing virtual representation of transfer key | 204 |
| Generating physical transfer key | 206 |

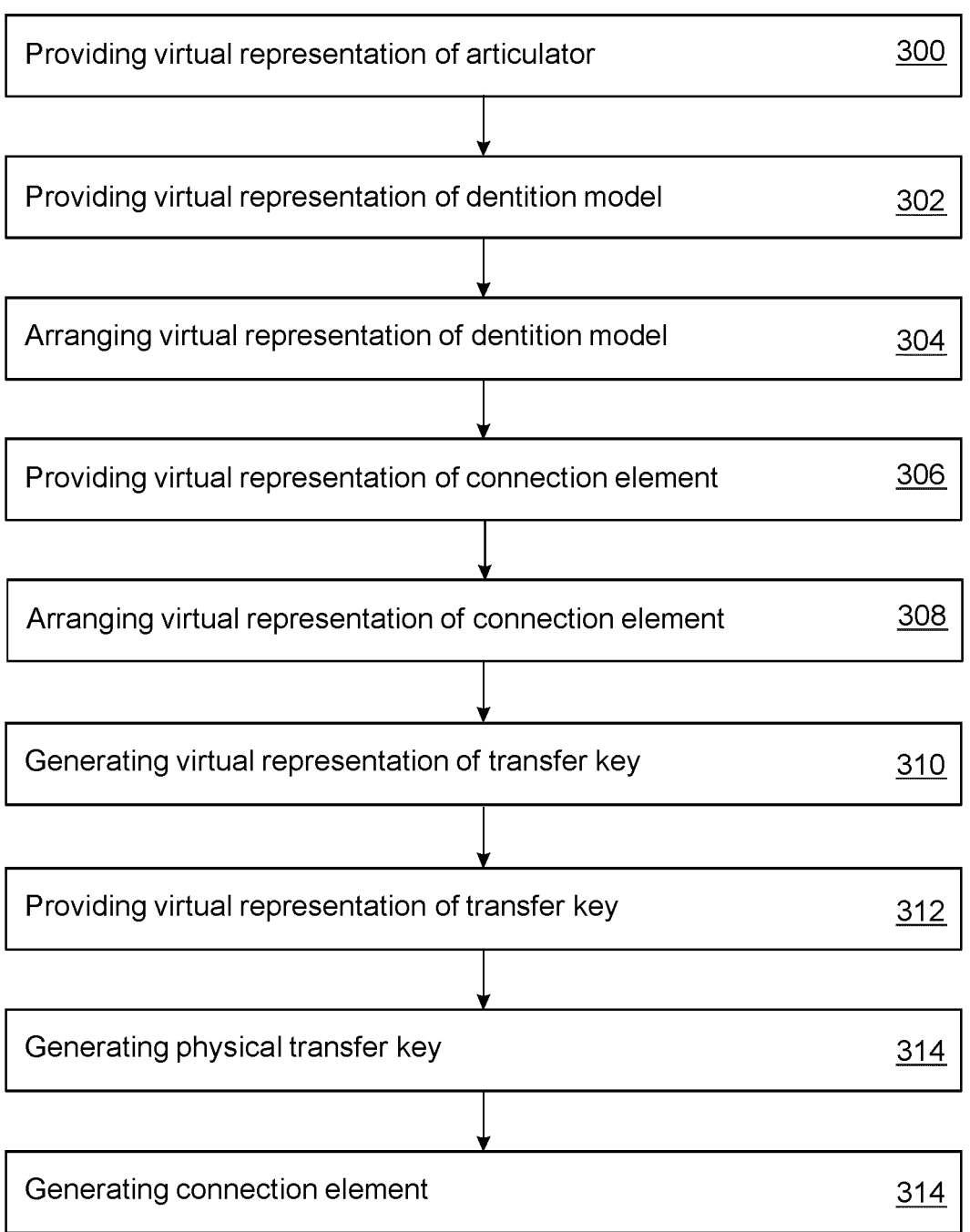

| Providing virtual representation of articulator | 300 |
| Providing virtual representation of dentition model | 302 |
| Arranging virtual representation of dentition model | 304 |
| Providing virtual representation of connection element | 306 |
| Arranging virtual representation of connection element | 308 |
| Generating virtual representation of transfer key | 310 |
| Providing virtual representation of transfer key | 312 |
| Generating physical transfer key | 314 |
| Generating connection element | 314 |

Fig. 19

| Providing physical articulator | 400 |
| Providing physical dentition model | 402 |
| Providing physical transfer key | 404 |
| Connecting physical transfer key | 406 |
| Supporting model component | 408 |
| Attaching 1. model component | 410 |
| Removing transfer key | 412 |
| Arranging 2. model component | 414 |
| Attaching 2. model component | 416 |

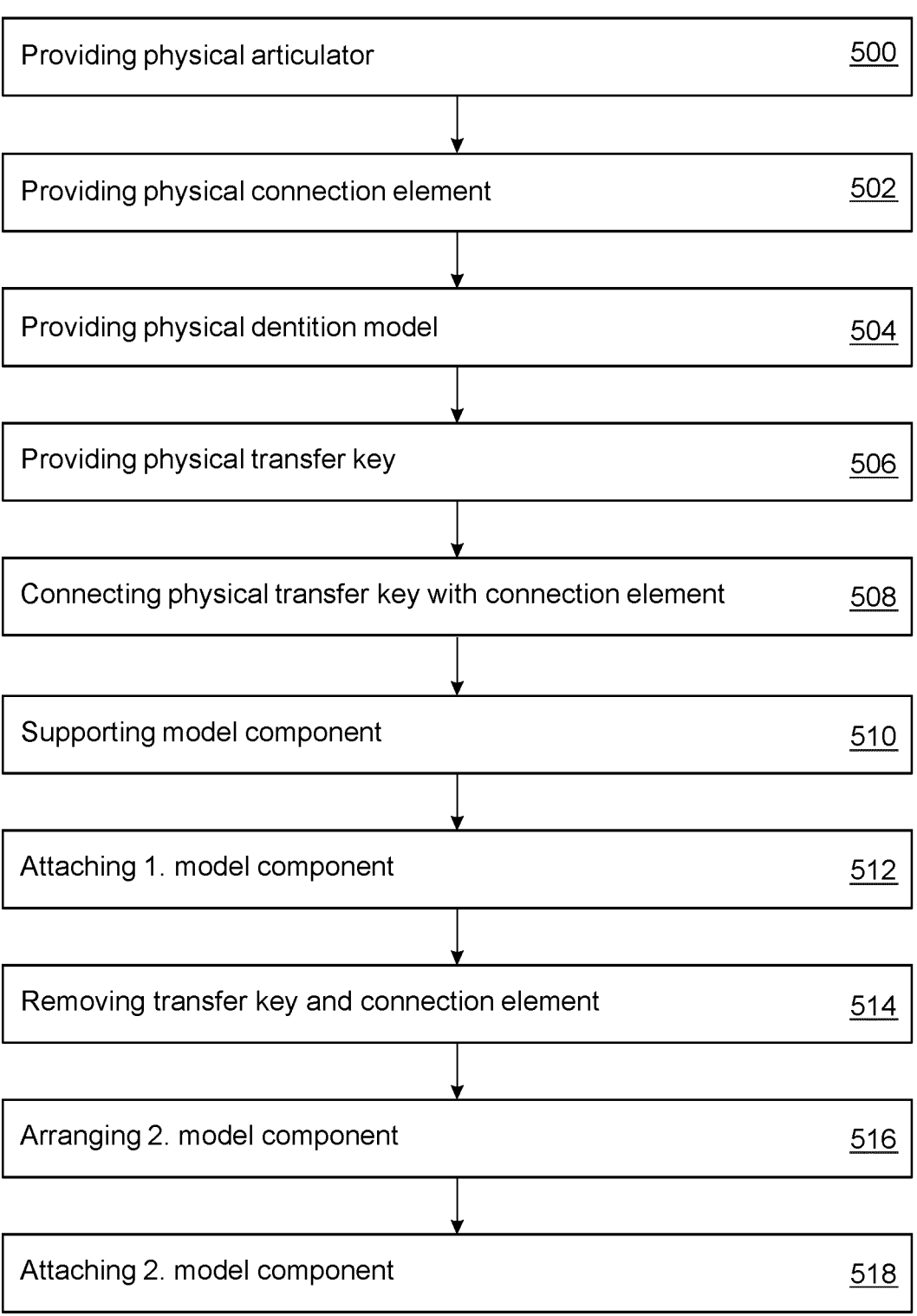

| Providing physical articulator | 500 |

| Providing physical connection element | 502 |

| Providing physical dentition model | 504 |

| Providing physical transfer key | 506 |

| Connecting physical transfer key with connection element | 508 |

| Supporting model component | 510 |

| Attaching 1. model component | 512 |

| Removing transfer key and connection element | 514 |

| Arranging 2. model component | 516 |

| Attaching 2. model component | 518 |

Fig. 21

PATIENT INDIVIDUAL PHYSICAL TRANSFER KEY

The invention relates to the field of dental technology. More particularly, the invention relates to a method for configurating a patient individual physical transfer key for transferring a virtually defined position of a three-dimensional (3D) virtual representation of a physical model of a patient's dentition within a 3D virtual representation of a physical articulator to the physical model of the patient's dentition and the physical articulator. The invention furthermore relates to a system and a computer program product for configurating such a patient individual physical transfer key as well as such a patient individual physical transfer key.

In dentistry a mechanical hinged device called an articulator is used to reproduce some or all the movements of the lower jaw in relation to the upper jaw of a patient. A model of the patient dentition, e.g., a plaster cast of the upper and lower jaw of the patient, is fixed to the articulator. The articulator is used to check that the interdigitation of the teeth of the model is correct and that the biting plane is anatomically functional for movements of the lower jaw in relation to the upper jaw using the articulator to simulate the respective movements. In order to determine the correct position of the model of the dentition in the articulator a so-called facebow may be used. A facebow is a mechanical device which is positioned at a patient's head and used to measure the position of the upper jaw of the patient relative to the temporomandibular joints, which are simulated by the articulator. The facebow may be adjusted to the anatomical features of the patient. After that the facebow may be attached to the articulator using the same adjustments determined at the user's head before. The facebow may be used to hold the model of the upper jaw at the same position within the articulator, which has been measured at the patient before. The model of the upper jaw is fixed to the articulator in the position defined by the facebow attached to the articulator. The position of the lower jaw may be determined using the position of the upper jaw fixed to the articulator. The model of the lower jaw positioned at the correct position is fixed to the articulator as well.

It is an objective of the invention to provide for a method, a system, a computer program product and a transfer key for enabling a transfer of a virtually defined position of a three-dimensional (3D) virtual representation of a physical model of a patient's dentition within a 3D virtual representation of a physical articulator to the physical model of the patient's dentition and the physical articulator.

In one aspect, the invention relates to a method for configurating a patient individual physical transfer key for transferring a virtually defined first position of a three-dimensional (3D) virtual representation of a physical model of a patient's dentition within a 3D virtual representation of a physical articulator to the physical model of the patient's dentition and the physical articulator.

The method comprises providing the 3D virtual representation of the physical articulator and providing the 3D virtual representation of the physical model of a patient's dentition. The 3D virtual representation of the dentition model comprises a 3D virtual representation of a model component of at least a part of the patient's upper jaw and a 3D virtual representation of a model component of at least a part of the patient's lower jaw. A first one of the 3D virtual representations of the model components of the dentition model is arranged at the first position. First and second support sections are defined for supporting the dentition model at the first position. The first support section is a section of the 3D virtual representation of the articulator and the second support section is a section of the first one of the 3D virtual representations of the model components of the dentition model. A 3D virtual representation of the physical transfer key is generated. The transfer key is configured for being connected to the first support section of the articulator and supporting the first one of the model components of the dentition model via the second support section. The 3D virtual representation of the physical transfer key is provided for generating the physical transfer key.

For example, the method further comprises generating the physical transfer key using the 3D virtual representation of the physical transfer key.

For example, the 3D virtual representation of the physical model of the patient's dentition may be provided. A virtual reconstruction of a patient's dentition may result in the 3D virtual representation of a physical model of a patient's dentition, i.e., a restauration of the patient's dentition. The virtual model of the restauration may be used to generate a physical model of the restauration, which may be checked using a physical articulator. However, in case a 3D virtual representation of a patient's dentition, i.e., a 3D virtual representation of a physical model on the patient's dentition, is used to perform virtual reconstruction, there is no physical facebow which can be used to transfer position data from the virtual representation to a physical articulator. For enabling a positioning of the physical model of the patient's dentition precisely at the same position as defined for the virtual model of the patient's dentition, rather a transfer key is used. A physical transfer key refers to a 3D object which is configured to be located between a physical dentition model, e.g., a model component of an upper jaw or a lower jaw, and to position and support the model component at a position within the physical articulator which is identical to a position defined for the 3D virtual representation of the respective model component within the 3D virtual representation of the physical articulator.

The 3D virtual representation of the physical model of the patient's dentition may be generated using scan data. For example, the scan data may be scan data from an intraoral scan of the patient's dentition. The respective scan data may provide information defining the surface structure and/or relative position of the upper jaw and lower jaw of the patient. The scan data may define the geometrical form of the teeth as well as the gingiva of the patient. Alternatively, the 3D virtual representation may be generated using scan data acquired by a scan of a model of the patient's dentition. Such a model may for example be a plaster model, e.g., a plaster cast model. To provide such a model, an impression of the patient's dentition may be taken. The respective impression may provide a negative of the model of the patient's dentition. Either such an impression may be scanned and resulting scan data may be used for generating the 3D virtual representation or a positive of the patient's dentition generated using the impression, e.g., in form of a plaster cast, may be scanned. In case a physical model of the patient's dentition is scanned, the respective model may for example be a model of the patient's actual dentition or it may be a model of a restauration of the patient's dentition for which the actual dentition has be used as an initial setup. For example, the physical model of the patient's dentition, for which the 3D virtual representation is provided, may be a model of the patient's actual dentition or a model of a restauration of the patient's dentition which is to be achieved by suitable measures.

The 3D virtual representation of the dentition model may comprise 3D virtual representations of at least a part of the patient's upper jaw and at least a part of the patient's lower jaw. For example, the 3D virtual representation of the dentition model may comprise a 3D virtual representation of the patient's complete upper jaw as well as the patient's complete lower jaw.

In addition, 3D virtual representation of the physical articulator may be provided. Such a 3D virtual representation of a physical articulator for example reproduces for the 3D virtual representation of the dentition model the movements, which may be performed with the physical articulator when using a physical dentition model. Furthermore, the 3D virtual representation of the physical articulator comprises precise measurements of the dimensions of the physical articulator.

The 3D virtual representation of the dentition model may be arranged at a first position within and thus relative to the 3D virtual representation of the physical articulator. For arranging the 3D virtual representation of the dentition model within the 3D virtual representation of the physical articulator digital data of a measurement of the position of the patient's upper jaw in relation to the temporomandibular joints may be used. This digital position data may for example be measured using a facebow which is configured to acquire and provide digital data of the respective relative position of the patient's upper jaw and temporomandibular joints. The 3D virtual representation of the dentition model may for example be arranged within the 3D virtual representation of the physical articulator in order to check and/or correct the occlusion of the dentition model, i.e., to ensure correct interdigitation of the teeth and an anatomically functional biting plane. Using the 3D virtual representation of the physical articulator movements of the lower jaw in relation to the upper jaw may be reproduced. In case the interaction of the models of the two jaws shows a deficit, the models may be corrected.

The 3D virtual representation of the physical articulator comprises at least one support section defined for supporting the dentition model at its position within the 3D virtual representation of the physical articulator. The support section of the 3D virtual representation of the articulator may be defined for supporting the 3D virtual representation of the model component of the patient's upper or lower jaw. For example, the 3D virtual representation of the physical articulator may comprise two support sections, each of which is defined for supporting one of the two 3D virtual representations of the model components of the patient's lower and upper jaw.

Furthermore, a further support section being a section of one of the two 3D virtual representations of the model components of the dentition model may be defined. This further support section may for example be a section of the 3D virtual representation of the model component of the patient's upper jaw. The respective further support section may be configured for supporting the 3D virtual representation of the model component of the patient's upper jaw at the first position within the 3D virtual representation of the dentition model. For example, the further support section may be a section of the 3D virtual representation of the model component of the patient's lower jaw. The respective further support section may be defined for supporting the 3D virtual representation of the model component of the patient's lower jaw at the first position within the 3D virtual representation of the dentition model. For example, two further support sections may be defined. One of the two further support sections may for example be a section of the 3D virtual representation of the model component of the patient's upper jaw. A second one of the two support sections may for example be a section of the 3D virtual representation of the model component of the patient's lower jaw.

For arranging the 3D virtual representation of the dentition model within the 3D virtual representation of the physical articulator no actual support is required since within a 3D virtual space any arbitrary position may be chosen. However, for positioning a physical dentition model within a physical articulator support is required to hold the dentition model at a predefined position. To define the position of the physical dentition model within the physical articulator and to hold the physical dentition model at the defined position the patient individual physical transfer key is provided.

For providing a patient individual physical transfer key, a 3D virtual representation of the physical transfer key is generated. The generated transfer key is configured for being connected to the support section of the articulator and supporting one of the model components of the dentition model via a support section of the respective model component. In order to provide the physical transfer key, the same is generated using the 3D virtual representation of the physical transfer key.

The physical transfer key may have the beneficial effect of transferring the position of the 3D virtual representation of the dentition model within the 3D virtual representation of the physical articulator, which is defined by digital position data, to the physical world. The physical transfer key may be positioned between the support section of the articulator and the support section of one of the model components of the dentition model. Thus, the relative position of the support section of the articulator and the support section of the model component of the dentition model may be defined. Furthermore, the physical transfer key may not only define the relative position between the support section of the articulator and the support section of the model component on the dentition model, it may further support the model component of the dentition model at the respective relative position within the physical articulator. Thus, the position of a dentition model within an articulator may be defined without need for a physical facebow to be fixed to the respective articulator.

For example, the physical transfer key may be generated using a 3D printing device. Generating the physical transfer key using a 3D printing device may have the beneficial effect of being able to directly transfer the 3D virtual representation of the physical transfer key from the virtual world to the physical world. For example, the physical transfer key may be generated using machining of a blank.

For example, the providing of the 3D virtual representation of the physical articulator may comprise selecting the respective 3D virtual representation from a set of 3D virtual representations of a plurality of different physical articulators.

Examples may have the beneficial effect of enabling a provision of an articulator-specific physical transfer key. Depending on the physical articulator to be used, the 3D virtual representation used for generating the 3D virtual representation of the physical transfer key may be selected. Thus, it may be ensured that the generated 3D virtual representation of the physical transfer key and thus the physical transfer key fits to the physical articulator to be used.

An articulator specific transfer key may be generated which is configured to be used in a specific type of articulator. Thus, it may be ensured that the respective transfer key is compatible with the physical articulator to be used.

In addition to generating the physical transfer key the physical articulator may be provided as well as the physical model of the patient's dentition. The physical model of the patient's dentition may be provided in form of a dentition model prepared, e.g., using plaster cast. For example, for providing the physical dentition model, a physical model which has been provided to be scanned and the scan data may have been used for providing the 3D virtual representation of the dentition model used to generate the 3D virtual representation of the physical transfer key. The scanned model may, e.g., be modified according to virtual adjustments applied to the 3D virtual representation of the dentition model.

According to embodiments the physical dentition model may be generated using the 3D virtual representation of the physical dentition model. For example, the respective physical dentition model may be generated using a 3D printing device or a machining device. Thus, the physical dentition model may be a physical copy of the 3D virtual representation used for generating the 3D virtual representation of the physical transfer key. The respective 3D virtual representation of the dentition model may be the result of a virtual reconstruction of the patient's dentition.

The physical transfer key may be connected to the support section of the physical articulator and support a model component of the physical dentition model at the first position using the physical transfer key connected with the physical articulator. Thus, the physical transfer key may define the relative position between the support section of the physical articulator and the support section of the supported model component of the dentition model.

The model component of the dentition model located at the first position is attached to the physical articulator. For example, an adhesive, like, e.g., plaster may be used to attach the model component of the dentition model to the physical articulator. For example, the physical articulator may comprise a section configured for attaching the model component of the dentition model. The space between the respective section and the model component of the dentition model may be filled with the adhesive, e.g., the plaster. When the adhesive is set, the physical key may be removed and the model component of the dentition model may be held at the first position within the physical articulator by the adhesive.

For arranging both model components of the dentition model, the method may, e.g., comprise providing the physical articulator and the physical model of a patient's dentition. The physical transfer key may be connected to the first support section of the physical articulator. The first one of the model components of the dentition model may be supported at the first position using the physical transfer key connected to the physical articulator. The first one of the model components of the dentition model located at the first position may be attached to the physical articulator and the physical transfer key may be removed.

For example, the method may further comprise arranging the second one of the model components of the dentition model at a second position relative to the first one of the model components of the dentition model. The second one of the model components of the dentition model located at the second position may be attached to the physical articulator.

Embodiments may have the beneficial effect that also the second model component of the dentition model may be attached to the physical articulator. For example, the first model component of the dentition model to be attached to the physical articulator may be the model component of the upper jaw, while the second model component to be attached to the physical articulator may be the model component of the lower jaw. For example, the first model component to be attached to the physical articulator may be the model component of the lower jaw, while the second model component to be attached to the physical articulator may be the model component of the upper jaw. The position of the second model component may be defined by the first model component already attached to the physical articulator. The second model component of the dentition model may for example be arranged at a second position relative to the first model component of the dentition model already attached to the physical articulator. For arranging the second model component relative to the first model component the teeth of the two jaws may be used. For example, an impression of the teeth of the two jaws may be provided. The impression may be arranged between the two model components, thus defining a position of the second model component relative to the first model component. For example, such an impression may be generated using a 3D virtual representation of an impression. The 3D virtual representation of the impression may be generated by filling the space between the two 3D virtual representation on the two model components in a predefined state of opening of the 3D virtual representation of the dentition model, i.e., in a specific position of the 3D virtual representation of the physical articulator. For example, the physical articulator may be arranged in the same position and the physical impression may be arranged between the two physical model components of the dentition model. The physical impression may be generated using a 3D printing device or a machining device.

For example, the second model component may be positioned relative to the first model component using a predefined interaction between the teeth of the two model components. For example, the second model component may be arranged such that a specific occlusion with the first model component may be achieved.

The second model component arranged at a second position relative to the first model component may be attached to the physical articulator. The physical articulator may provide a section configured for attaching the second model component. For example, the second model component may be attached to the respective section using an adhesive, like, e.g., plaster. For example, the space between the respective section and the second model component may be filled with the adhesive, e.g., the plaster. Once the adhesive is set, the physical articulator can be used to reproduce movements of the patient's jaw using the model components of the dentition model. Thus, e.g., a dental technician can check for a correct interdigitation of the teeth of dentition model as well as for an anatomical functional biting plane.

For example, the physical transfer key may be configured to be connected to the first support section of the physical articulator directly.

Embodiments may have the beneficial effect that no further elements are required in order to connect the transfer key to the physical articulator. For example, the transfer key may be shaped on one side such that it provides a geometry which is a negative of a geometry of the support section of the physical articulator. Thus, the transfer key may be easily positioned at the respective support section of the physical articulator. In order to secure the connection between the transfer key and the physical articulator, for example mounting elements may be used, like, e.g., pins or holds.

For example, the support section of the physical articulator may be provided by an incisal needle of the physical articulator. For example, the incisal needle of the articulator may comprise a hole, in which a support arm of the transfer key may be inserted. The support arm of the transfer key may extend from the hole of the incisal needle of the physical articulator to the first position at which at the model component on the dentition model is to be arranged. At the opposite end of the support arm, i.e., at the distal end of the support arm from the point of view of the support section of the physical articulator, the transfer key may comprise a support element for supporting the model component of the dentition model. The support element may for example be configured to provide a three-point support of the model component. The support element may be shaped as a negative of a surface of the model component facing away from the section of the physical articulator at which the respective model component is to be attached to.

The transfer key may comprise a plurality of support arms to be connected to a plurality of support sections of the physical articulator in order to support the model component of the dentition model at the first position.

For example, the physical transfer key may be configured to be connected to the first support section of the physical articulator via a physical connection element. The method may further comprise providing a 3D virtual representation of the physical connection element. The 3D virtual representation of the physical connection element may be used for generating the 3D virtual representation of the physical transfer key.

Embodiments may have the beneficial effect that a specific connection element may be provided for connecting the transfer key to the physical articulator. Providing a connection element may have the beneficial effect that due to the size of the connection element the distance to be bridged by the transfer key in order to support the model component in the first position may be reduced. For example, a plurality of connection elements may be provided and a connection element may be selected depending on the size of the dentition model in order to reduce the space to be bridged by the transfer key to a predefined distance or predefined range of distances.

In addition to the 3D virtual representation of the physical articulator a 3D virtual representation of the physical connection element may be provided and used for generating the 3D virtual representation of the physical transfer key.

The connection element may for example be an articular specific connection element. Thus, in case of a plurality of 3D virtual representations of physical articulators, one or more connection elements may be provided for each one of the respective 3D virtual representations of physical articulators.

The connection element may comprise one or more mounting elements in order to enable a mounting of the transfer key to the respective connection elements. The mounting elements may for example comprise one or more mounting pins and/or mounting holds. The connection element may comprise a site facing the support section of the physical articulator, which is shaped as a negative of the respective support section of the physical articulator. Thus, the physical connection element may be easily positioned and fixed to the support section of the physical articulator.

For example, the physical connection element may be provided in form of a perforated plate. Providing a plurality of mounting holds, the perforated plate may be configured for mounting physical transfer keys of different sizes to the perforated plate.

Patient individual transfer keys may differ in size. Furthermore, a transfer key may comprise one or more parts. For example, the transfer key may be provided in form of a single part. For example, the transfer key may be provided in form of two parts, which are not connected with each other. For example, both parts are connected with the connection element in order to support the model component at least at two points. For example, the transfer key may comprise three parts, not connected with each other. Each of the three parts may be connected to the connection element, supporting the model component at three points.

For example, the method may further comprise generating the physical connection element using the 3D virtual representation of the connection element. Examples may have the beneficial effect that in addition the physical connection element may be provided and thus may be used for arranging the model components within the physical articulator using the transfer key.

For example, the physical connection element may be generated using a 3D printing device. Generating the physical connection element using a 3D printing device may have the beneficial effect of being able to directly transfer the 3D virtual representation of the physical connection element from the virtual world to the physical world. For example, the physical connection element may be generated using machining of a blank.

For example, the physical connection element may be a generic connection element independent of the individual patient's dentition model and adapted for usage with the physical articulator.

Examples may have the beneficial effect that using a generic connection element may allow to use one and the same connection element for a plurality of patients. Thus, the respective connection element is not required to be produced multiple times for multiple users, but may rather be reused. Thus, material may be saved for generating connection elements.

For example, the physical connection element may be a patient individual connection element.

Examples may have the beneficial effect that a connection element may be provided and may be generated, which is adjusted for the patient individual transfer key of an individual patient. Thus, the connection element may be optimized for connecting the patient individual transfer key to the articulator.

For example, an intraoral scan of the patient's physical dentition, i.e., the upper and lower jaw with the respective teeth, may be performed or a physical impression of the patient's dentition may be taken. The impression or a physical cast of the patient's dentition generated using the impression as a negative may be scanned. Thus, virtual scan data of the patient's physical dentition may be provided. A 3D virtual representation of the dentition model of the patient's physical dentition may be generated using the virtual scan data.

The 3D virtual representation of the patient's physical dentition may be used as an initial model on which a virtual reconstruction is performed. The virtual reconstruction may comprise a reconstruction of defective teeth and/or a replacement of defective or missing teeth. The result of the virtual reconstruction may be a virtual model of a restoration of the patient's dentition.

Furthermore, a digital facebow may be used to acquire position data of the patient's jaws in digital form. Such a digital facebow may measures parameters regarding the position of the patient's jaws and provide the measured data in digital form. The virtual position data of the patient's jaws may be transferred computer and imported into a program providing a virtual articulator. The facebow may for example be used to determine the position data of the upper jaw, i.e., maxilla, in relation to the base of the skull and/or the temporomandibular joints. The facebow may, e.g., use the patient's external auditory canals and nose as reference positions. For example, the facebow may be fixed on both sides of the external auditory canals, e.g., with olives, and with a nose support on the patient's head. Alternatively, the facebow may be fixed to the patient's head and the relative position of the external auditory canals and/or the nose may be measured. Furthermore, the position of the upper and/or lower jaw relative to the reference positions is determined. For example, a mouthpiece, like a bite fork, is provided. The mouthpiece is, e.g., pressed against the chewing surfaces or incisal edges of the maxillary teeth to measure their position. Furthermore, the position data of the lower jaw, i.e., mandible, in relation to the maxilla may be measured. Thus, a registration of the position(s) of the patient's jaw(s) may be provided.

In addition, data regarding the patient's individual movements of the mandible in relation to the maxilla may be measured and provided as digital input data for a virtual articulator. The digital position data of the patient's jaws may be imported into the virtual articulator. The 3D virtual representation of the restoration of the patient's dentition may be imported into the 3D virtual representation of the physical articulator. The 3D virtual representation of the restoration of the patient's dentition may be positioned in the virtual articulator using the digital position data of the patient's dentition.

The 3D virtual representation of the physical articulator may be used to perform a virtual articulation of the virtual model of the restoration, i.e., to adjust the articulation of the virtual model of the restoration. The articulation refers to the contact relationship of the occlusal surfaces of the upper and lower teeth when moving into and away from centric occlusion. In the course of the virtual articulation, the 3D virtual representation of the restoration, i.e., the restoration, may be adjusted until a suitable articulation is achieved. For example, the reconstructions may be adjusted. Furthermore, the position of the 3D virtual representation of the restoration within the 3D virtual representation of the physical articulator may be adjusted and/or fine-tuned. For example, the digital position data may only define the position of the upper jaw, while the position of the lower jaw may be adjusted relative to the upper jaw. Thus, the position of the upper jaw may define the position of the lower jaw.

In order to be able to physically check the virtually defined occlusion, a physical copy of the 3D virtual representation of the dentition model, e.g., in form of a plaster model, may be generated. The physical copy may be arranged in a physical articulator used for checking the occlusion of the physical copy of the virtual model.

A physical articulator is a mechanical hinged device used in dentistry to which a model, e.g., a plaster cast, of the maxillary, i.e., upper, and mandibular, i.e., lower, jaw of a patient is fixed and which is configured to reproducing some or all the movements of the mandible in relation to the maxilla. A 3D virtual representation of a physical articulator is a virtual model of an articulator in which a 3D virtual representation of model of a patient's dentition with a model component of the upper jaw and a model component of the lower jaw is arranged and which is configured to reproduce the same movements as the physical articulator, i.e., some or all the movements of the mandible in relation to the maxilla. The virtual model of dentition may be a virtual model of the current physical dentition of a patient, generated e.g., using scan data of the current physical dentition of the respective patient. Furthermore, the virtual model of dentition may be a virtual model of a restoration of the patient's dentition for which, e.g., a virtual model of the current physical dentition is used as an initial setup.

The human maxilla is fixed and the scope of movement of the mandible and therefore the dentition is dictated by the position and movements of the bilateral temporomandibular joints, which sit in the glenoid fossae in the base of the skull. Principal movements and positions reproduced by an articulator are for example at rest, i.e., centric jaw relation, in protrusion, i.e., to bite, from side to side, i.e., lateral excursion, to chew, in retrusion, and any possible combination of the aforementioned.

An articulator may be used for an accurate fabrication of the biting surfaces of, e.g., removable prosthodontic appliances, i.e., dentures; fixed prosthodontic restorations, like implants, crowns, bridges, inlays and onlays; or orthodontic appliances. An articulator may be used to ensure a correct interdigitation of teeth and an anatomically functional biting plane. Using an articulator may have the beneficial effect, that less occlusal adjustments before and after fitting dental appliances may be required and fewer chronic conflicts between teeth and jaw joints may be achieved.

A dental impression is a negative imprint of a patient's dentition, i.e., the teeth and soft tissues, i.e., gingiva, in the mouth from which a positive reproduction in form of a cast or model may be formed. For example, appropriate impression material may be placed in a stock or custom dental impression tray designed to roughly fit over the dental arches. The impression material may be of liquid or semi-solid nature when first mixed and placed in the mouth. The impression material may set and leave an imprint of the patient's dentition as well as surrounding structures of the oral cavity.

For example, a physical model of a restoration of a patient's dentition may be provided. The physical model may, e. g., already exist or the physical model may, e.g., be generated using the 3D virtual representation. For example, the physical model may be generated using 3D printing or machining of a blank. A patient individual physical transfer key may be provided for fitting the physical model into the physical articulator. The patient individual physical transfer key may have the advantage of providing a firm hold for the physical model. The patient individual physical transfer key may further be easily position within the physical articulator and may accurately defined the position of the physical model within the physical articulator. The patient individual physical transfer key may comprise one or more parts. In case of multiple parts, the respective parts may be physically contactable with each other and/or with the physical model providing firm connections. The connections may be connections which can be non-destructively disconnected.

The patient individual physical transfer key may be connected to the physical articulator directly or using a connection element. The connection element may comprise multiple mounting elements, e.g., mounting holes and/or mounting pins, for mounting the physical transfer key on the connection element. The connection element may for example be provided in form of a perforated plate or a plate comprising a plurality of mounting pins. The connection plate may be mountable on the physical articulator. The physical articulator may for example comprise a retaining element for retaining the connection element. The connection element may be non-destructively detachable from the retaining element. For example, the connection element may be part of the articulator.

The connection element may for example be a generic connection element, i.e., the position, form and size of the connection element may be the same for different patients. The same connection element may be used for different patients. The position at which the transfer key can be connected to the connection element may be known.

A 3D virtual representation of the connection element may be added to the virtual articulator and may be displayed as part of the virtual articulator or as an additional element provided in addition to the virtual articulator.

For example, a plurality of 3D virtual representations of connection elements with different heights may be provided. The virtual models of connection element to be used may be selected from the plurality of virtual models of connection elements in dependence of the size, e.g., height, of the virtual model of the restoration. The smaller the size, e.g., height, of the virtual model of the restoration, the larger the height of the selected virtual model of the connection element may be. Using a connection element with a larger height may have the beneficial effect of being able to use a transfer key with a smaller height. Thus, material, e.g., printing material, required to produce the transfer key may be saved.

For example, a physical copy of each of the 3D virtual representations of the plurality of 3D virtual representations of connection elements may be provided. For use in the physical articulator the physical copy of the 3D virtual representation of the connection element selected for use in the virtual articulator may be used.

The connection element may either be used for connecting the model component of the patient's upper jaw or the model component of the patient's lower jaw with the transfer key to the physical articulator. The position of the model component of the patient's lower or upper jaw may be defined by the form of the transfer key. The transfer key may be configured to be mounted on the connection element using mounting elements. The connection element may only comprise a few mounting elements, e.g., one, two or three mounting elements, like mounting holes or mounting pins.

The connection element in form of a plate may be attached to a base provided by the articulator. The connection element and the base may be provided as one part, i.e., the base may be formed integrally with connection element. For example, the connection element and the base may be provided in form of two connectable parts. The connection between the two parts, i.e., the connection element and the base may be a non-destructively detachable connection, e.g., a plug connection or a magnetic connection.

Calculating a patient-specific, i.e., patient individual, 3D virtual representation of the physical transfer key may comprise determining the distance between a surface of the 3D virtual representation of the model component of the patient's lower or upper jaw, which faces the 3D virtual representation of the connection element fixed to the virtual articulator and the 3D virtual representation of the connection element. The patient individual 3D virtual representation of the physical transfer key may be configured to extend between the 3D virtual representation of the model component of the patient's lower or upper jaw and the virtual model of the connection element. A first surface of the 3D virtual representation of the physical transfer key may be shaped as a negative of the surface or a part of the surface of the of the 3D virtual representation of the model component of the patient's lower or upper jaw, which faces the virtual model of the connection element. A second surface of the 3D virtual representation of the physical transfer key facing away from the first surface, i.e., facing the virtual model of the connection element may comprise one or more mounting elements. The mounting elements of the 3D virtual representation of the physical transfer key may be configured to mount the 3D virtual representation of the physical transfer key on the connection element.

For example, the 3D virtual representation of the physical transfer key may comprise a single element configured to support the model component of the patient's lower or upper jaw. For example, the 3D virtual representation of the physical transfer key may comprise a plurality of elements configured to support the model component of the patient's lower or upper jaw. For example, the 3D virtual representation of the physical transfer key may comprise three elements configured to provide a stable 3-point support for the model component of the patient's lower or upper jaw. For example, each of the elements of the 3D virtual representation of the physical transfer key may have an elongated form, e.g., a bolt-shaped or cylindrical form.

The physical transfer key may be produced using the 3D virtual representation of the physical transfer key. The physical transfer key may be mounted on the connection element. For example, a plug-in-connection may be used to mount the physical transfer key on the connection element.

The physical model component of the patient's lower or upper jaw may be placed on or clicked into the transfer key. The physical model component positioned within the physical articulator using the physical transfer key may be attached to the articulator, e.g., using an adhesive like plaster. When the adhesive has set and the physical model component is firmly attached to the articulator, e.g., such that the physical model component cannot be removed from the articulator anymore without destructing the adhesive, e.g., plaster, forming the connection, the physical transfer key and the physical connection element may be removed from the physical articulator to give way for the physical model component of the patient's other jaw. The physical model component of the patient's other jaw, i.e., the upper jaw or the lower jaw, may be placed on the physical model component already attached to the physical articulator in the first position. The physical model of the model component of the patient's other jaw, i.e., the upper jaw or the lower jaw, may be attached to the physical articulator using an adhesive, e.g., plaster, as well.

In another aspect, the invention relates to a system for configurating a patient individual physical transfer key for transferring a virtually defined first position of a three-dimensional (3D) virtual representation of a physical model of a patient's dentition within a 3D virtual representation of a physical articulator to the physical model of the patient's dentition and the physical articulator. The system comprises a computer device with a processor operatively coupled to a computer-readable storage medium storing computer-readable program instructions.

The computer-readable program instructions, when executed by the processor, cause the processor to control the system to provide the 3D virtual representation of the physical articulator and the 3D virtual representation of the physical model of a patient's dentition. A first one of the 3D virtual representations of the model components of the dentition model is arranged at the first position. First and second support sections are defined for supporting the dentition model at the first position. The first support section is a section of the 3D virtual representation of the articulator and the second support section is a section of the first one of the 3D virtual representations of the model components of the dentition model. A 3D virtual representation of the physical transfer key is generated. The transfer key is configured for being connected to the first support section of the articulator and supporting the first one of the model components of the dentition model via the second support section. The 3D virtual representation of the physical transfer key is provided for generating the physical transfer key.

The system may be configured for providing a patient individual physical transfer key according to any of the aforementioned examples.

For example, the system may further comprise a manufacturing device for generating the physical transfer key using the 3D virtual representation of the physical transfer key.

For example, the manufacturing device may comprise a 3D printing device for generating the physical transfer key using 3D printing. For example, the manufacturing device may comprise a machining device configured for machining blanks.

In another aspect, the invention relates to a computer program product comprising a non-volatile computer-readable storage medium having computer-readable program instructions embodied therewith for configurating a patient individual physical transfer key for transferring a virtually defined first position of a three-dimensional (3D) virtual representation of a physical model of a patient's dentition within a 3D virtual representation of a physical articulator to the physical model of the patient's dentition and the physical articulator.

Execution of the computer-readable program instructions by a processor causes the processor to control a computer device to provide the 3D virtual representation of the physical articulator and the 3D virtual representation of the physical model of a patient's dentition. A first one of the 3D virtual representations of the model components of the dentition model is arranged at the first position. First and second support sections are defined for supporting the dentition model at the first position. The first support section is a section of the 3D virtual representation of the articulator and the second support section is a section of the first one of the 3D virtual representations of the model components of the dentition model. A 3D virtual representation of the physical transfer key is generated. The transfer key is configured for being connected to the first support section of the articulator and supporting the first one of the model components of the dentition model via the second support section. The 3D virtual representation of the physical transfer key is provided for generating the physical transfer key.

The computer-readable program instructions of the computer program product may be configured for providing a patient individual physical transfer key according to any of the aforementioned examples.

For example, the execution of the computer-readable program instructions by a processor may further causes the processor to control a manufacturing device communicatively connected to the computer device to generate the physical transfer key using the 3D virtual representation of the physical transfer key.

For example, the manufacturing device may comprise a 3D printing device for generating the physical transfer key using 3D printing.

In another aspect, the invention relates to a patient individual physical transfer key for transferring a virtually defined first position of a three-dimensional (3D) virtual representation of a physical model of a patient's dentition within a 3D virtual representation of a physical articulator to the physical model of the patient's dentition and the physical articulator. The physical transfer key is configured for being connected to a first support section. The first support section is a support section of the physical articulator intended for supporting a model component of the dentition model of at least a part of the patient's jaw. The physical transfer key is further configured for supporting the model component of the dentition model at the first position via a second support section. The second support section is a support section of the model component.

The patient individual physical transfer key may be configured and generated according to any of the aforementioned examples.

The above described examples and embodiments may be combined freely as long as the combinations are not mutually exclusive.

In the following, embodiments of the invention are described in greater detail in which FIGS. 1A-1C show exemplary 3D virtual representations of an articulator and model components of dentition models;

FIG. 19 shows a flowchart illustrating an exemplary method for configurating and generating a physical transfer key;

FIG. 21 shows a flowchart illustrating an exemplary method for using a physical transfer key.

In the following similar features are denoted by the same reference numerals.

Figure 1A:
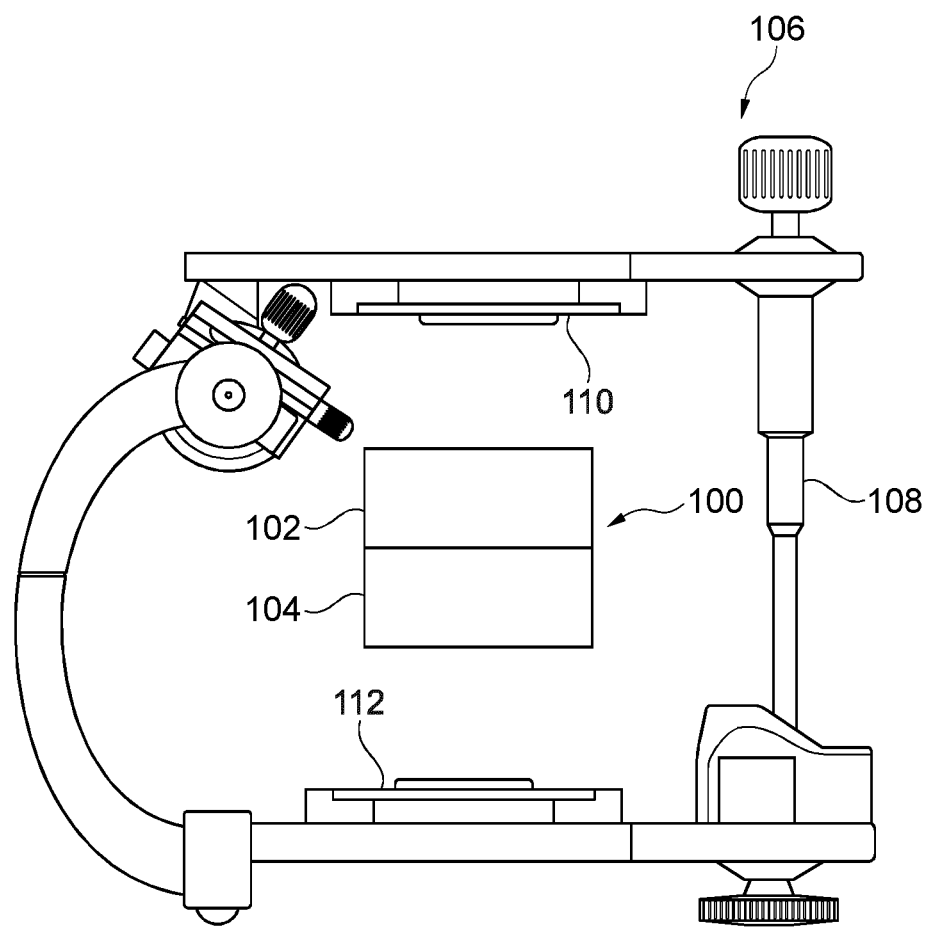

FIG. 1A shows a side view of an exemplary 3D virtual representation, i.e., a 3D virtual model 106 of a physical articulator. Within the 3D virtual model 106 of the physical articulator a 3D virtual representation 100 of a dentition model is arranged. The 3D virtual representation 100 of the dentition model may be positioned at a first position within 3D virtual representation 106 of the physical articulator. The respective position data for positioning the 3D virtual representation 100 at the first position may be provided using a facebow to digitally measure the relative position of a patient's upper jaw relative to the patient's temporomandibular joints. The 3D virtual representation 100 of the dentition model may comprise a model component 102 representing the upper jaw and a model component 104 representing the lower jaw. For example, the position data may define the position of the model component 102 and/or the model component 104 within the 3D virtual representation 106 of the articulator. According to examples, the relative position between the two model components 102, 104 may be defined by relative position data based on scanning an impression of the patient's dentition.

The virtual articulator 106 may for example comprise a first section 110 and a second section 112, which are each configured for attaching the model component of the upper jaw and the model component of the lower jaw, respectively, to the articulator. The virtual articulator 106 may further comprise an incisal needle 108.

Figure 1B:
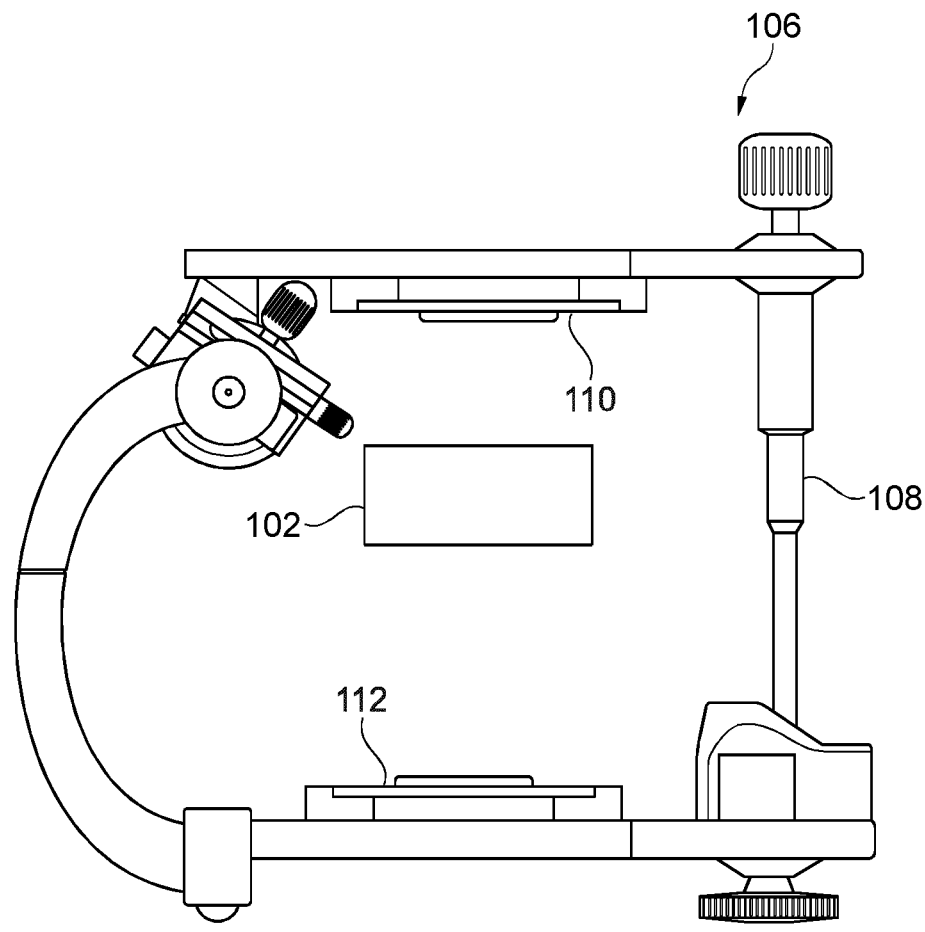
Figure 1C:
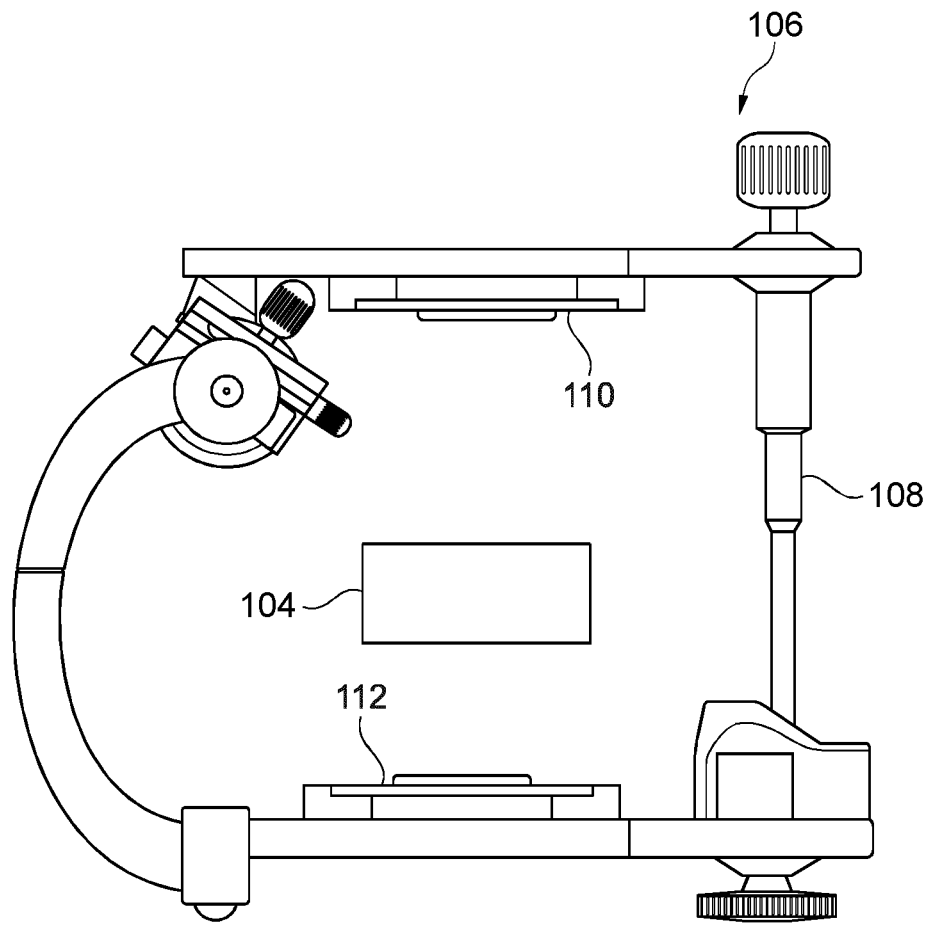

FIG. 1B shows a side view of an exemplary 3D virtual model 106 of a physical articulator, in which only the model component 102 representing the upper jaw is arranged. FIG. 1C shows a side view of an exemplary 3D virtual model 106 of a physical articulator, in which only the model component 104 representing the lower jaw is arranged. For example, the 3D virtual representation 106 of the articulator may be used to reproduce movements of the patient's upper and lower jaws using the two model components 102, 104. It may be checked that the interdigitation of the teeth of the model components is correct and that the biting plane is anatomically functional. In case of a positive result of the check, e.g., one of the model components may be selected for which a transfer key is to be configurated. For example, the model component 102 representing the upper jaw or the model component 104 representing the lower jaw may be selected as a first one of the model components for which transfer key is configurated, while the other second model component is removed from the 3D virtual model 106 of a physical articulator. Starting with the arrangement shown in FIG. 1A with both model components 102, 104 and removing one of the model components may result in the arrangement shown in FIG. 1B or the arrangement shown in FIG. 1C. In FIG. 1B model component 102 is the selected remaining model component. In FIG. 1C model component 102 being the selected remaining model component. Alternatively, one may start with the arrangements of FIG. 1B or 1C directly.

Figure 2:
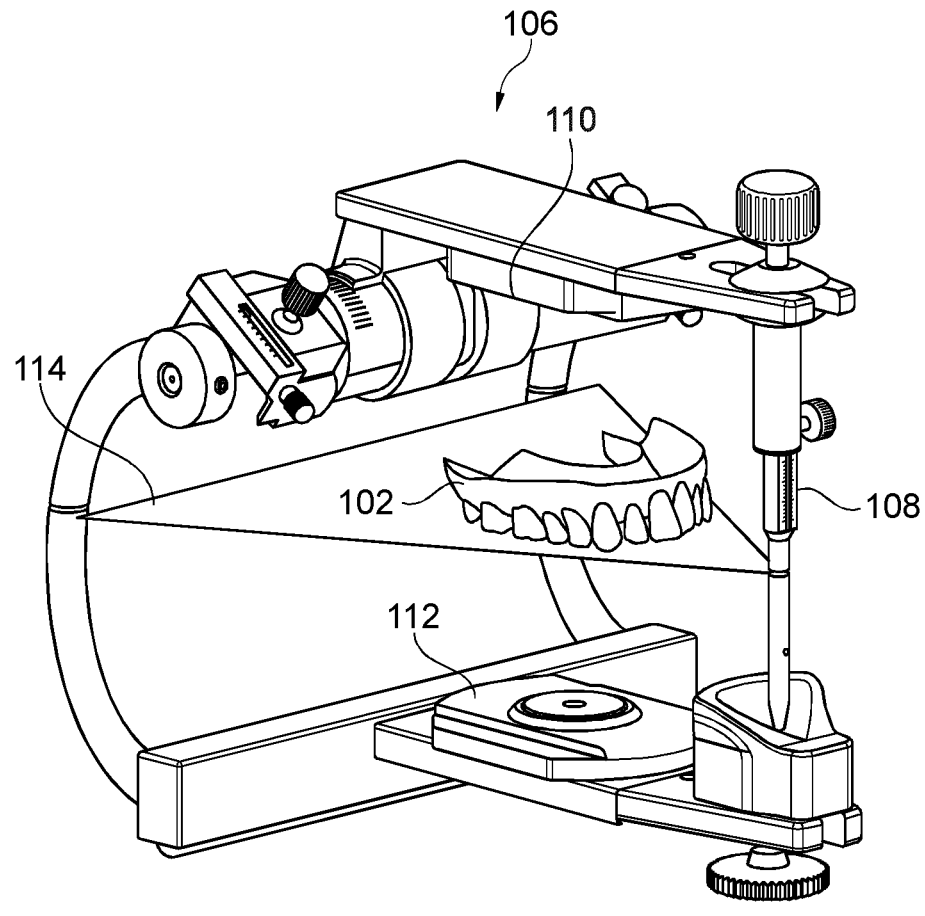
FIG. 2 shows an exemplary 3D virtual representation of an articulator and a model component of an upper jaw.

FIG. 2 shows a perspective view of the virtual articulator 106. Within the virtual articulator 106 the virtual model component 102 of the upper jaw is positioned at the first position within the virtual articulator 106. For example, the position of the virtual model component 102 may be defined in the plane 114. The virtual articulator 106 may further define a section 110 and a section 112 for attaching model components of dentition models to the articulator 106. The virtual articulator 106 may further comprise an incisal needle 108. For example, a virtual dentition model 100 comprising a model component 102 of the upper jaw and a model component 104 of the lower jaw may be arranged within the virtual articulator 106. The virtual articulator 106 may be used for reproducing movements of the patient's jaw. The model 100 may be checked and/or amended to ensure accurate occlusion between the teeth of the two model components 102, 104. In case the occlusion is accurate, one of the components 102, 104 may be removed. For example, the model component 104 of the lower jaw may be removed, resulting in the situation depicted in FIG. 2.

Figure 3:
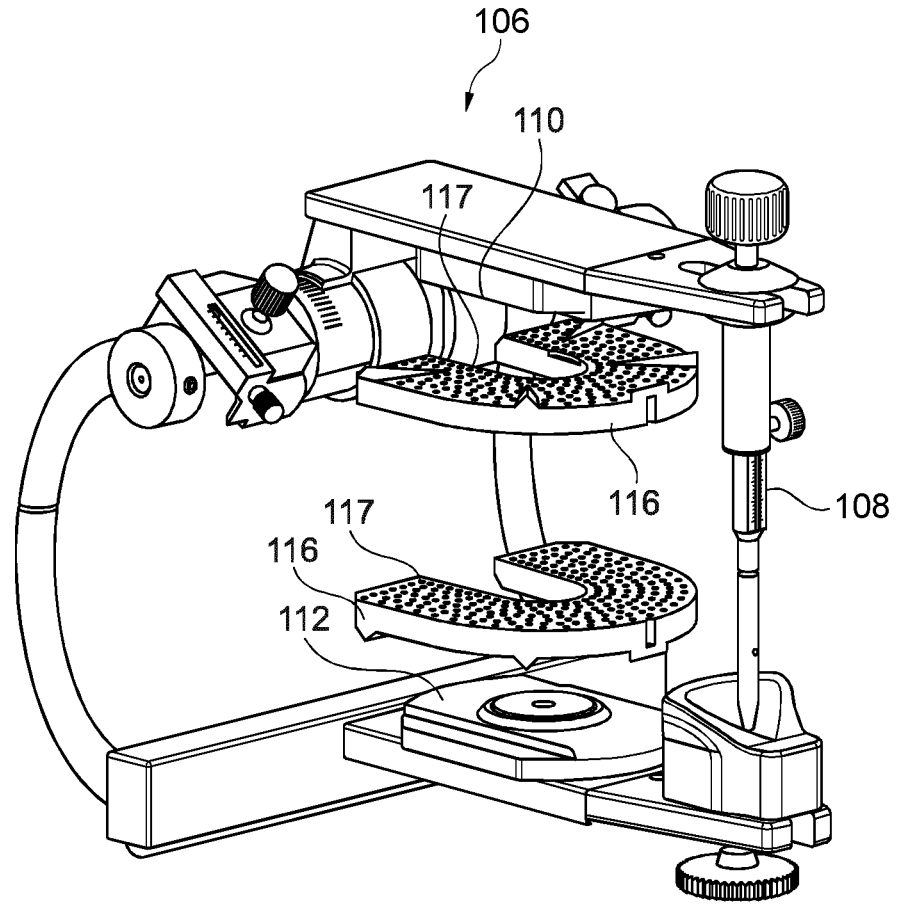
FIG. 3 shows an exemplary 3D virtual representation of an articulator and a connection element.

FIG. 3 shows the virtual articulator of FIG. 2. In addition, an exemplary connection element 116 is shown with two different orientations for connecting a transfer key (not shown) to the virtual articulator 106. The exemplary connection element 116 shown in FIG. 3 is provided in form of a perforated plate. The plate is for example bow-shaped. The connection element 116 may be configured to be mounted on the section 110 and/or to the section 112 on the virtual articulator 106. In that case the section 106 and/or section 112 are configured as support sections for the one of the model components 102, 104. For example, the connection element 116 may comprise a plurality of mounting holes configured to receive mounting pins of a transfer key (not shown) in order to mount the transfer key on the connection element and thus connecting the transfer key to the virtual articulator 106.

Figure 4A:
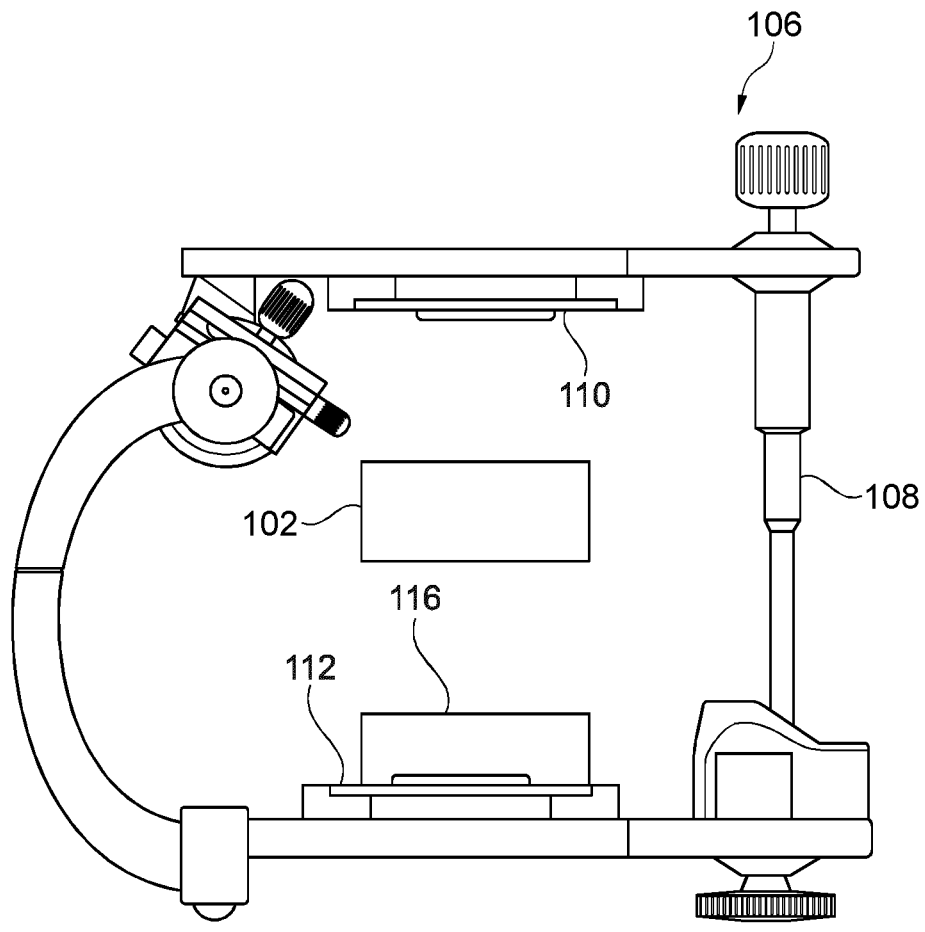
FIGS. 4A-4B show exemplary 3D virtual representations of an articulator, a model component and a connection element.
Figure 4B:
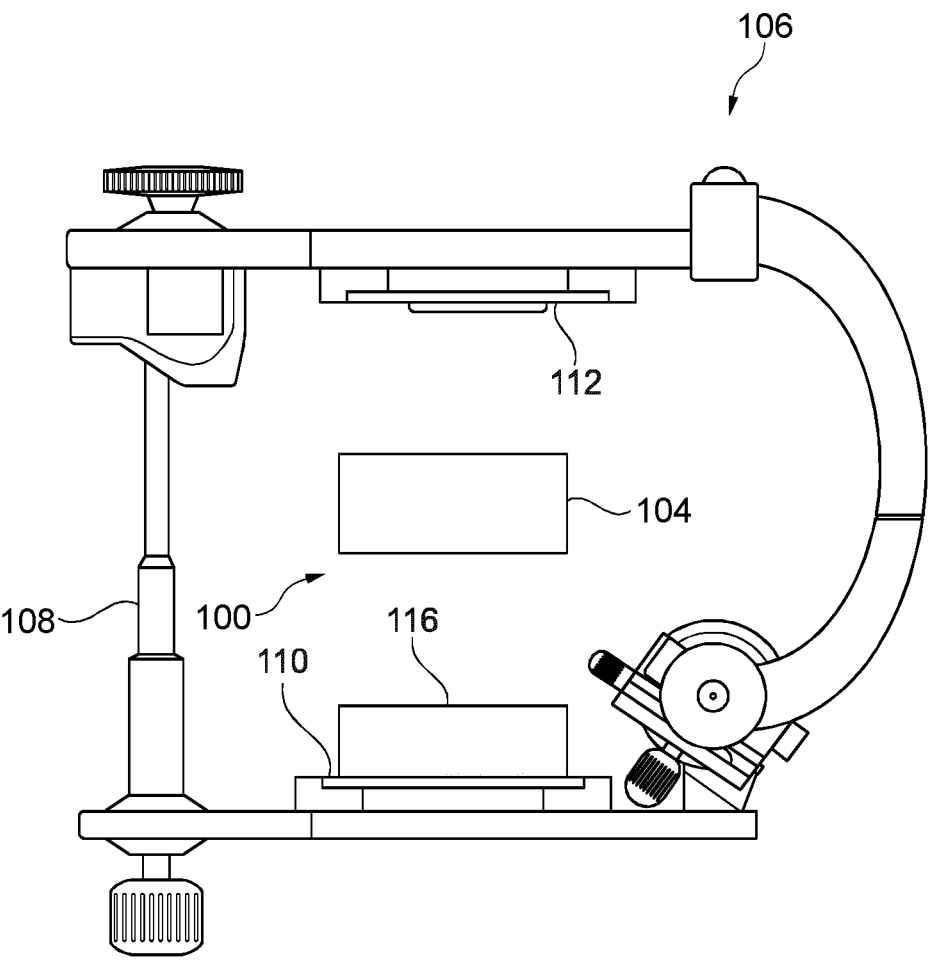

FIGS. 4A-4B show exemplary side views of the virtual articulator 106 with one of the model components 102, 104 positioned at a first position within the virtual articulator 106. Furthermore, the connection element 116 is arranged on one of the support sections 110, 112 of the virtual articulator in order to enable a connection of a transfer key (not shown) to the virtual articulator 106, which supports the model component 102, 104 on the support section 110, 112, respectively.

FIG. 4A shows the model component 102 of the upper jaw arranged within the virtual articulator 106. The teeth of the upper jaw face towards the section 112 of the virtual articulator which provides a support for the model component 102 on the section 112. A connection element 116 is arranged. The connection element 116 is configured to connect a transfer key (not shown) to the virtual articulator 106 by mounting the transfer key onto the connection element 116. FIG. 4B shows the same virtual articulator 106 within which a model component 104 of the lower jaw is positioned at the first position. The teeth of the model component 104 of the lower jaw face towards the section 110 of the virtual articulator 106, which is used as a support section for supporting the model component 104 within the virtual articulator 106. In case of a physical articulator, the respective articulator may have to be turned around topside down for supporting a model component of the lower jaw on the section 110 via a transfer key mounted on a connection element between the respective model component of the lower jaw as well as the respective section. Within the virtual articulator 106 furthermore a virtual representation of a virtual connection element 116 is arranged on section 102 of the virtual articulator 106 in order to enabling a connection between a transfer key (not shown) to the virtual articulator 106.

Figure 5:
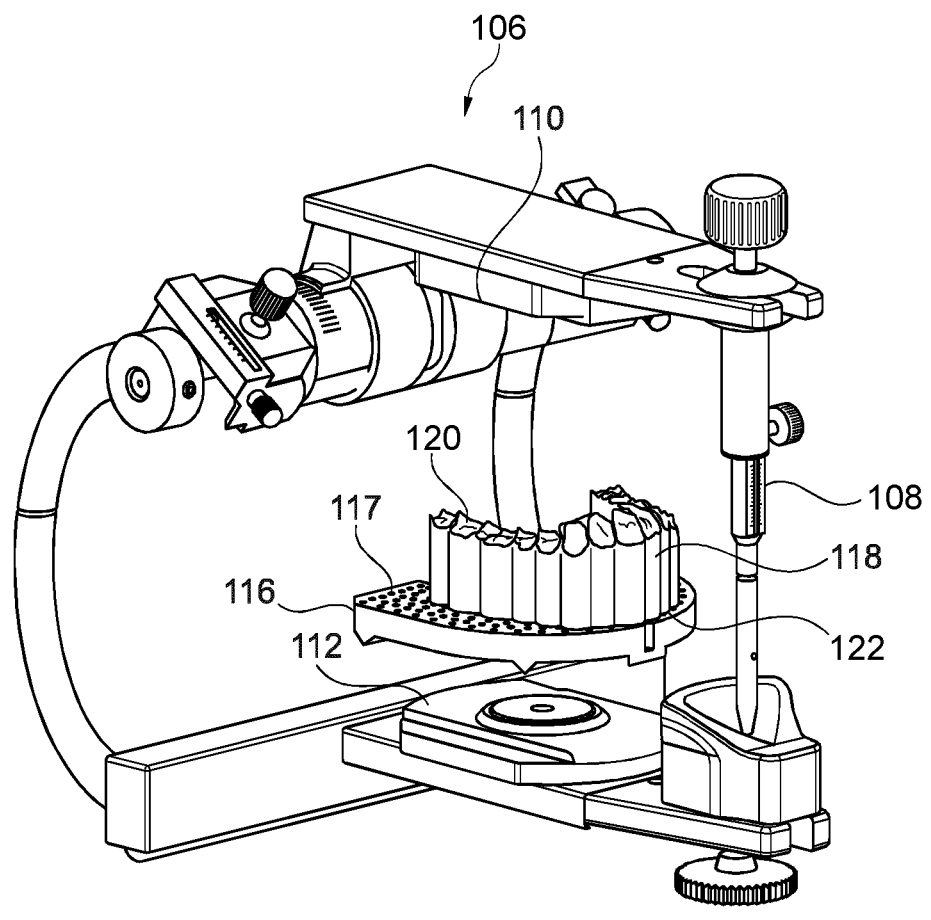
FIG. 5 shows an exemplary 3D virtual representation of an articulator, a transfer key and a connection element.

FIG. 5 shows the articulator 106 of FIG. 3 with the virtual representation of the connection element 116 on which a virtual representation 118 of a transfer key is mounted. The transfer key 118 may comprise one or more parts. For example, the transfer key 118 may be designed as a single part which bridges the space between the connection element 116 and the model component 102 to be supported by the transfer key 118. The transfer key 118 may alternatively be configured to be connected to the section 112 directly, without using a connection element 116. Alternatively, the connection element 116 may be part of the transfer key 118. Using a generic connection element 116 as shown in FIGS. 3 and 5 may have the advantage, that less material is required for generating the transfer key 118. The virtual transfer key 118 shown in FIG. 5 comprises a mounting surface 122 facing the connection element 116. The mounting surface 122 may comprise a plurality of mounting pins, which are configured to be inserted into the mounting holds 117 of the connection element 116. The mounting holds 117 may be distributed such that for a given arrangement of mounting pins only a single combination of mounting holds 117 is configured to receive the respective mounting pins. Furthermore, the virtual transfer key 118 may comprise a support surface 124 supporting the model component 102 of the upper jaw. The surface 120 may be shaped as a negative of the surface of the lower jaw and/or negative of the upper jaw. Thus, the position of the model component 102 of the upper jaw on the transfer key 118 may be precisely defined.

Figure 6A:
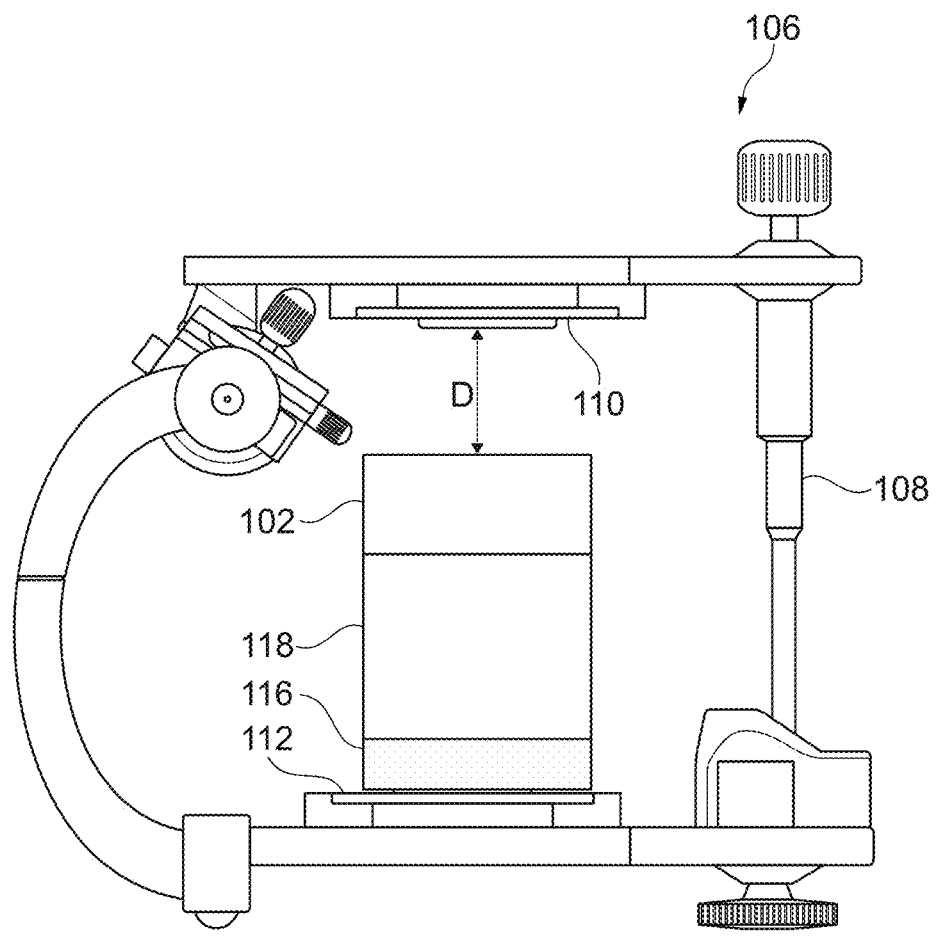
FIGS. 6A-6B show exemplary 3D virtual representations of an articulator, a model component, a transfer key and a connection element.
Figure 6B:
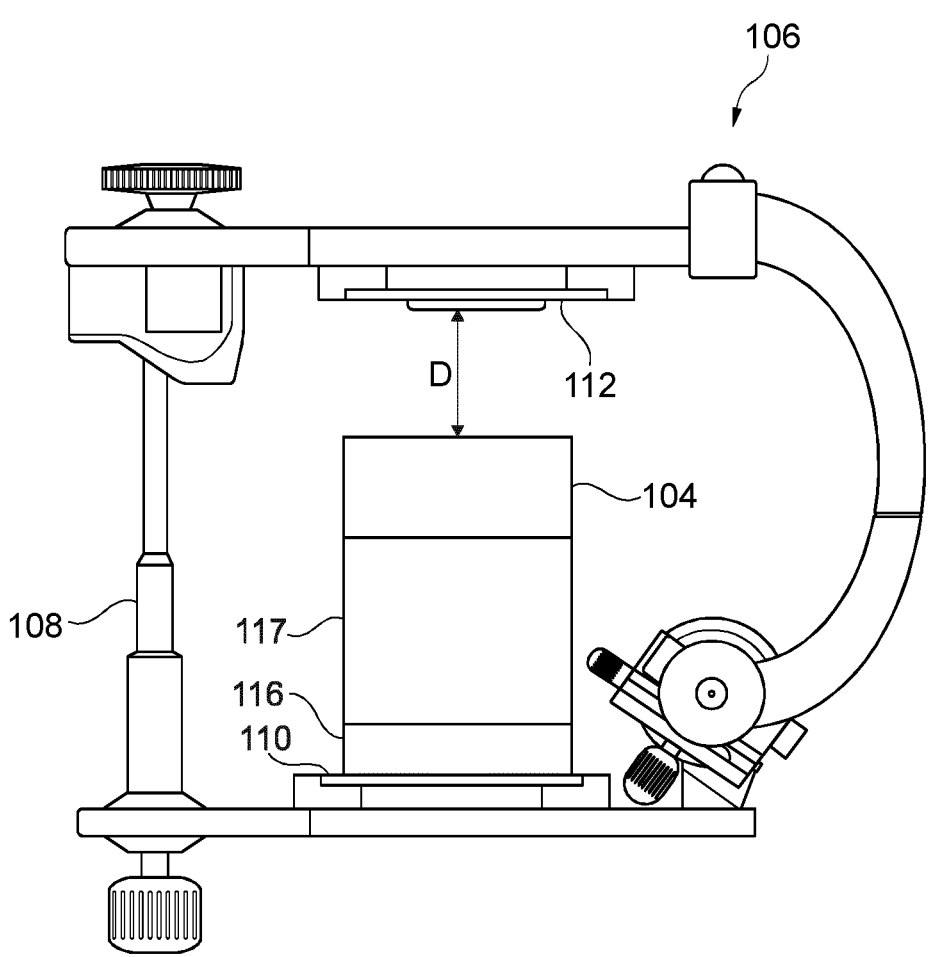

FIGS. 6A-6B show side views of exemplary combinations of a virtual articulator 106 with a model component 102, 104, a transfer key 118 and a connection element 116 arranged within the virtual articulator 106. FIG. 6A shows a side view of the virtual articulator 106 with model component 102 of the upper jaw positioned at a first position in the virtual articulator 106. Furthermore, a virtual connection element 116 is arranged on section 112 used as a support section for supporting the model component 102 on the upper jaw. Between the connection element 116 and the model component 102 of the upper jaw a virtual transfer key 118 is arranged. The virtual transfer key 118 is configured to support the model component 102 of the upper jaw on section 112 of the virtual articulator 106. Furthermore, the virtual transfer key 118 precisely defines the position of the model component 102 of the upper jaw relative to the virtual articulator 106. When the same arrangement is reproduced in the physical world using a physical articulator, physical connection element, physical transfer key, and physical model component, the physical model component may be positioned at the same position relative to the physical articulator as the virtual model component 102 in FIG. 6A relative to the virtual articulator 106. The remaining distance D shown in FIG. 6A between the virtual model component 102 and virtual articulator 106 may be filled, i.e., bridged, in the physical world using an adhesive, like, e.g., plaster, to fix the physical model component to the physical articulator in the relative position defined by physical transfer key.

FIG. 6B shows a side view of the virtual articulator 106 with a model component 102 for a lower jaw arranged therein. Furthermore, a virtual connection element 116 is mounted on section 110 of the virtual articulator 106. Section 110 is used as a support section for supporting model component 104 of the lower jaw at the first position within the virtual articulator 106. For supporting model component 104 of the lower jaw within the articulator a transfer key 116 is provided, which defines the relative position between model component 104 of the lower jaw and virtual articulator 106. When the same arrangement is reproduced in the physical world using a physical articulator, physical connection element, physical transfer key, and physical model component, the physical model component may be positioned at the same position relative to the physical articulator as the virtual model component 104 in FIG. 6B relative to the virtual articulator 106. The remaining distance D shown in FIG. 6B between the virtual model component 104 and virtual articulator 106 may be filled, i.e., bridged, in the physical world using an adhesive, like, e.g., plaster, to fix the physical model component to the physical articulator in the relative position defined by physical transfer key.

Figure 7A:
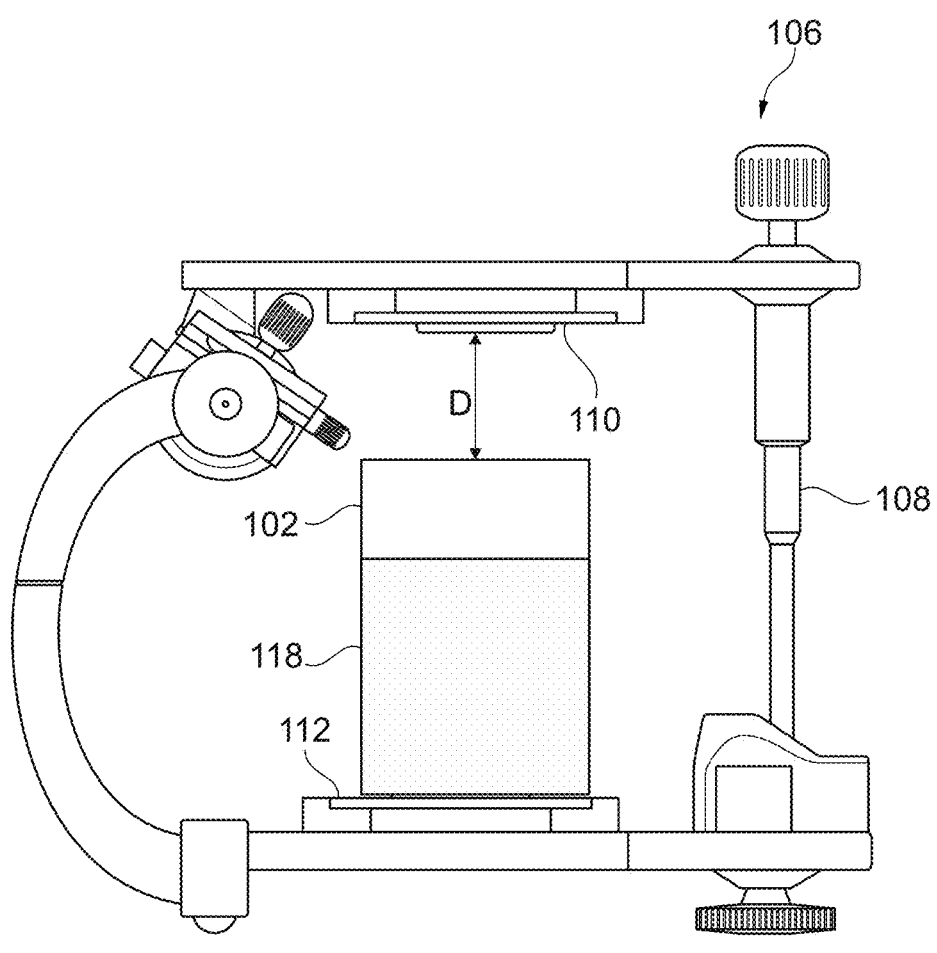
FIGS. 7A-7B show exemplary 3D virtual representations of an articulator, a model component and a transfer key.
Figure 7B:
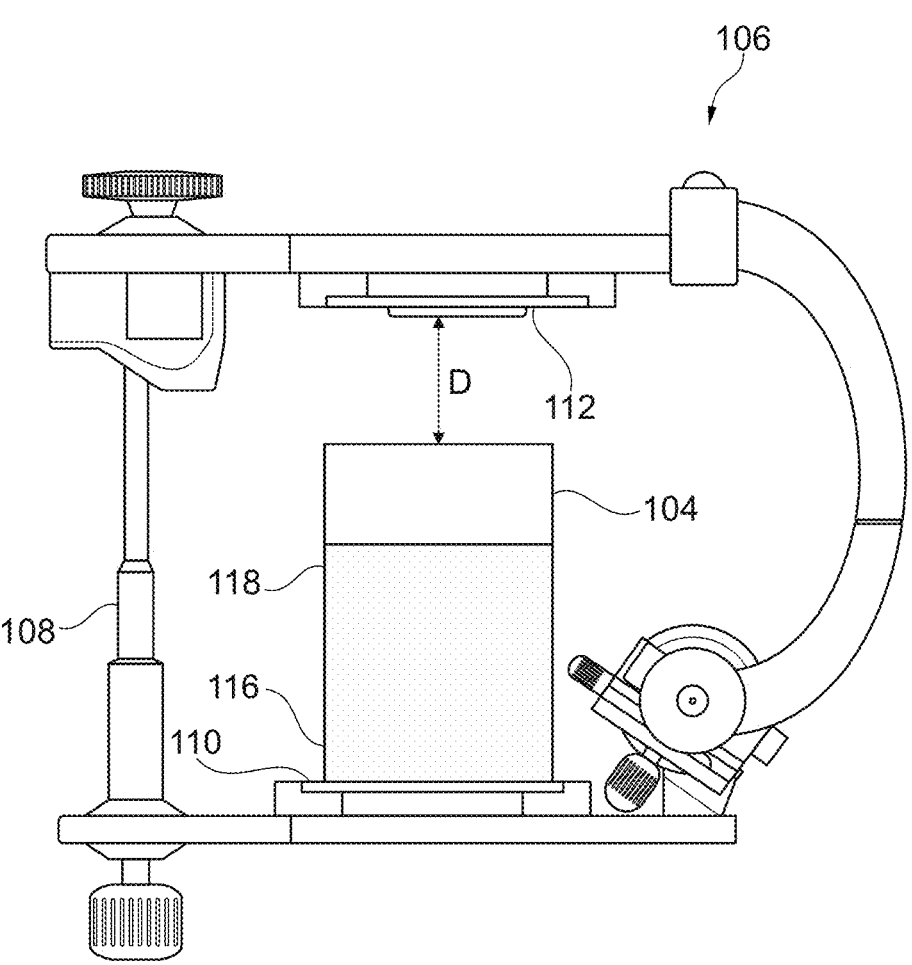

FIGS. 7A-7B show side views of exemplary combinations of a virtual articulator 106 with a model component 102, 104 and a transfer key 118 arranged within the virtual articulator 106. FIG. 7A shows a side view of a virtual articulator 106, in which a model component 102 of an upper jaw is arranged. The model component 102 is supported at the first position by a transfer key 118 arranged between the model component 102 and a support section 112 of the virtual articulator 106. The transfer key 118 in this case is directly connected to the virtual articulator 106 without using an additional connection element. When the same arrangement is reproduced in the physical world using a physical articulator, physical transfer key, and physical model component, the physical model component may be positioned at the same position relative to the physical articulator as the virtual model component 102 in FIG. 7A relative to the virtual articulator 106. The remaining distance D shown in FIG. 7A between the virtual model component 102 and virtual articulator 106 may be filled, i.e., bridged, in the physical world using an adhesive, like, e.g., plaster, to fix the physical model component to the physical articulator in the relative position defined by physical transfer key.

In FIG. 7B a side view of a virtual articulator 106 is shown, in which a model component 104 of a lower jaw is arranged at the first position. The model component 104 is supported at the first position by a transfer key 118. The virtual transfer key 118 is in case of FIG. 7B connected directly to the virtual articulator 106 and defines the position of the model component 104 of the lower jaw in the virtual articulator 106. When the same arrangement is reproduced in the physical world using a physical articulator, physical transfer key, and physical model component, the physical model component may be positioned at the same position relative to the physical articulator as the virtual model component 104 in FIG. 7B relative to the virtual articulator 106. The remaining distance D shown in FIG. 7B between the virtual model component 104 and virtual articulator 106 may be filled, i.e., bridged, in the physical world using an adhesive, like, e.g., plaster, to fix the physical model component to the physical articulator in the relative position defined by physical transfer key.

Figure 8:
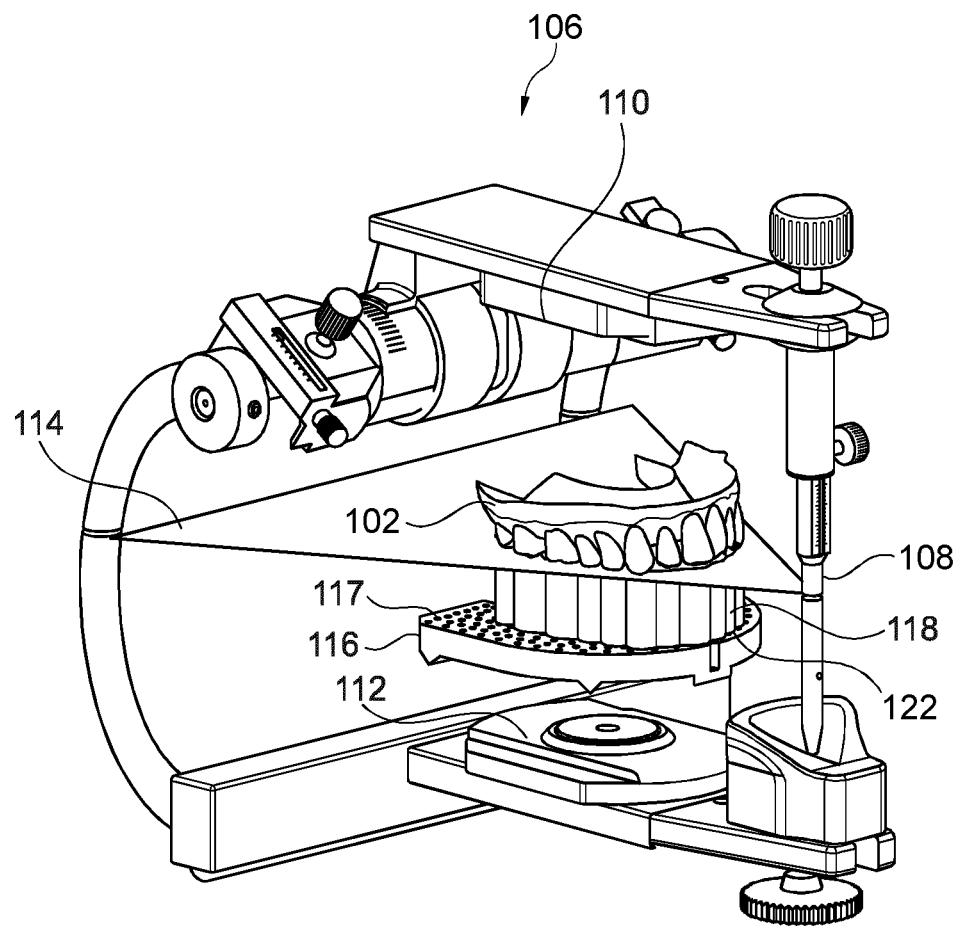
FIG. 8 shows an exemplary 3D virtual representation of an articulator, a model component, a transfer key and a connection element.

FIG. 8 shows the virtual articulator 106 of FIG. 5 with the connection element 116 as well as the virtual transfer key 118. The virtual transfer key 118 is mounted on the connection element 116. On the support surface 120 of the transfer key 118 model component 102 of the upper jaw is arranged. The position on the virtual transfer key 118 on the connection element 116 as well as the position of the model component 104 of the upper jaw on the virtual transfer key 118 are uniquely defined. Thus, the transfer key may be used to uniquely define the position of model component 104 on the upper jaw within the virtual articulator 106.

Figure 9:
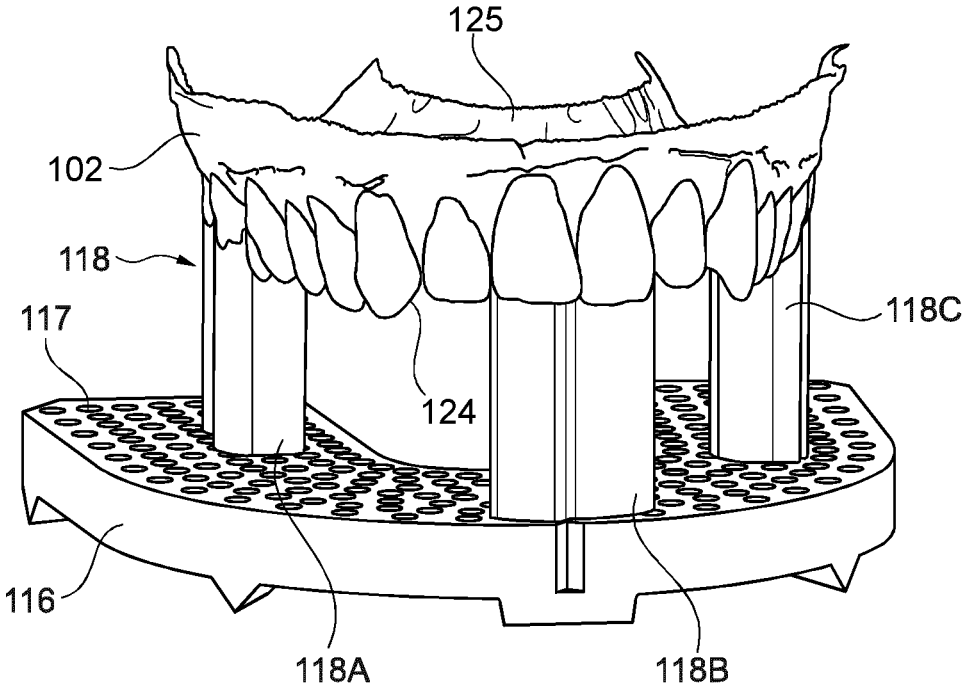
FIG. 9 shows an exemplary 3D virtual representation of a model component, a transfer key and a connection element.

FIG. 9 shows an alternative implementation of a transfer key 118. The transfer key 118 as shown in FIG. 9 comprises three parts 118A, 118B, 118C. The three parts of the transfer key 118 provide for example a three-point support of model component 104 of the upper jaw on the connection element 116. Each of the three parts 118A, 118B, 118C of transfer key 118 is mounted on the connection element 116. For example, the position of each part 118A, 118B, 118C of the transfer key 118 on the connection element 116 is uniquely defined by the geometric distribution of mounting pins of a mounting surface 122A, 122B, 122C of the respective parts 118A, 118B, 118C. The geometric distribution of the respective mounting pins may be configured such that it only fits to a single position, i.e., a single geometric distribution of a single set of mounting holes 117 provided by the connection element 116. Thus, each of the parts 118A, 118B, 118C of the transfer key 118 may only be connectable at a single unique position with the connection element 116. The three parts 118A, 118B, 118C of transfer key 118 for example be independent of each other, i.e., not connected with each other. For example, the three parts 118A, 118B, 118C of transfer key 118 may be connected with each other, e.g., by bridges.

Figure 10A:
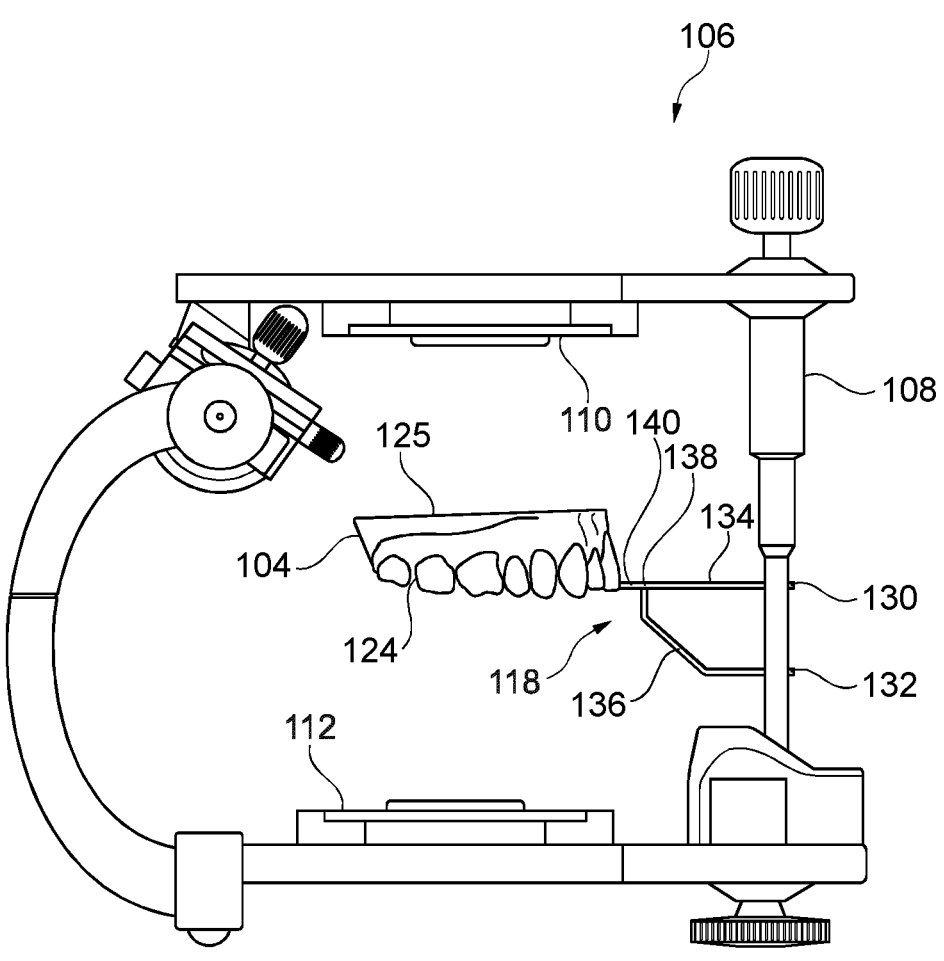
FIGS. 10A-10B show exemplary 3D virtual representations of a model component and a transfer key.
Figure 10B:
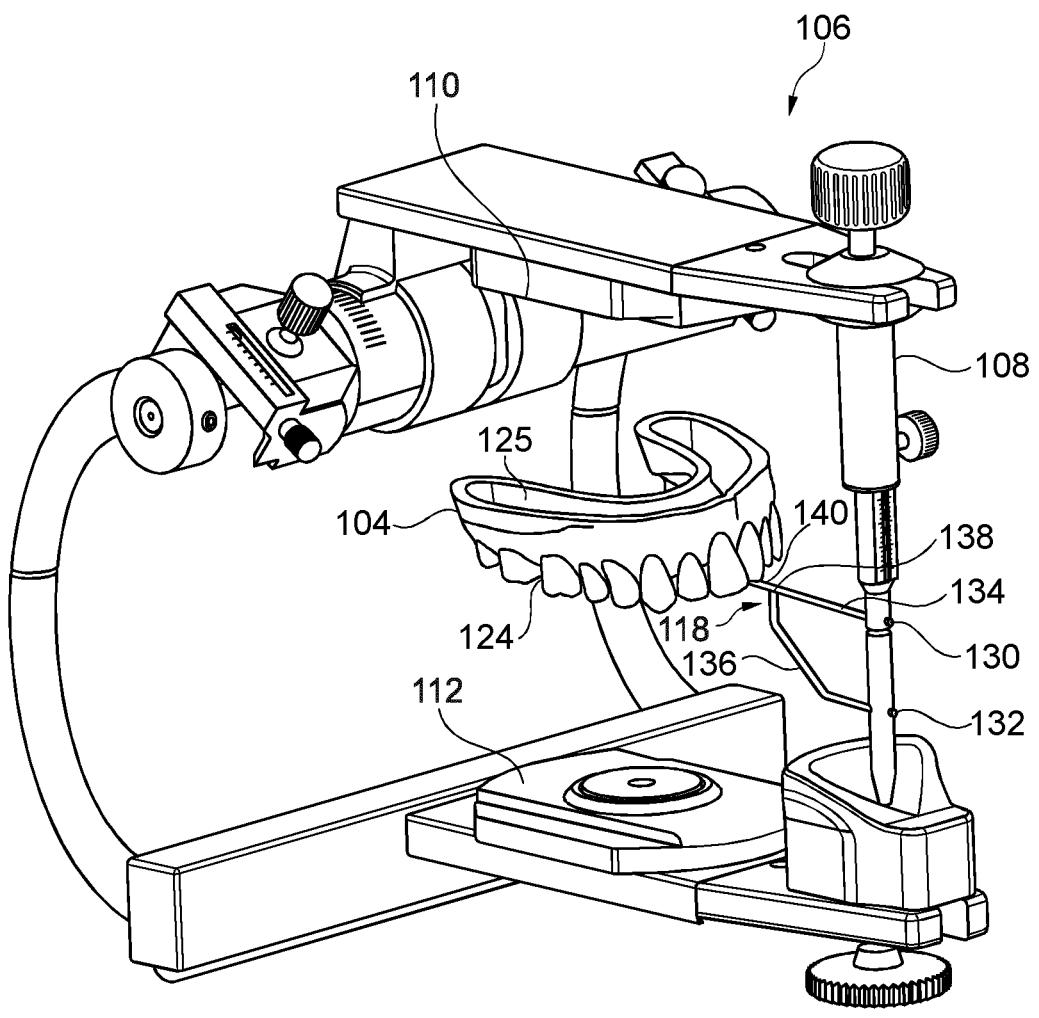

FIG. 10A shows a side view of an exemplary virtual articulator 106 comprising two sections 110, 112 for attaching model components 102, 104 of a dentition model 100 to the articulator 106 as well as an incisal needle 108. The incisal needle 108 may comprise two through-holes 130 and 132. The transfer key may for example comprise two support arms 134 and 136 which are each inserted into one of the holes 130, 132 of the incisal needle. The two support arms 134 and 136 may be connected at a connection point 138 which forms a support triangle defined by the connection point 138 and the two holes 130, 132 of the incisal needle 108. The transfer key 118 may further comprise a support element 140 attached to the connection point 138 of the two support arms 134, 136. The support element 140 may comprise three support sections providing a three-point support of the model component 102 of the upper jaw. Alternatively, the support element 140 may comprise a support surface similar to the support surface 120 shown in FIG. 5. FIG. 10B shows a perspective view of the artificial articulator 106 of FIG. 10A with model component 102 of the upper jaw being supported by the transfer key 118 of FIG. 10A.

Figure 11A:
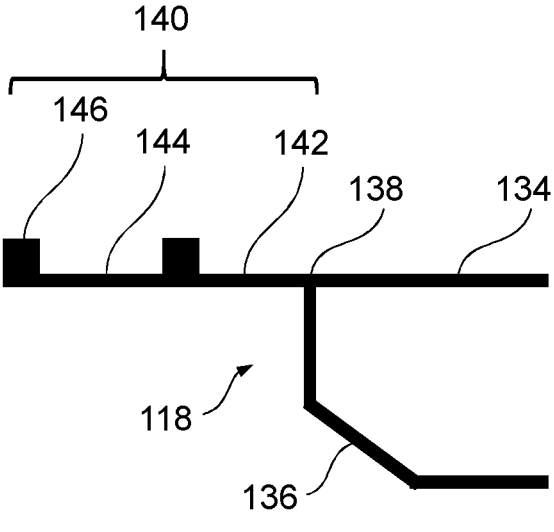
FIGS. 11A-11B show exemplary 3D virtual representations of a transfer key.
Figure 11B:
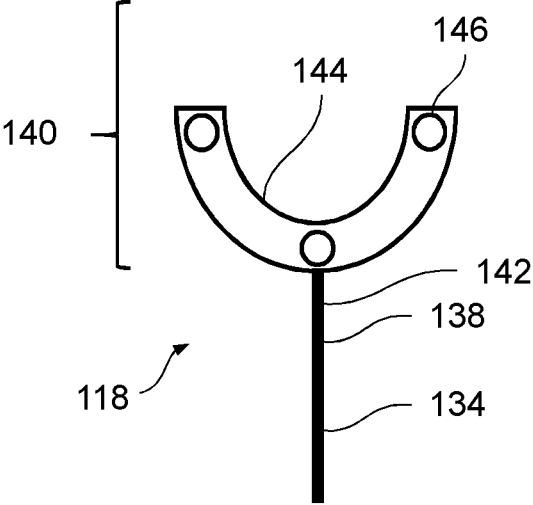

FIGS. 11A-11B shows an exemplary implementation of the transfer key 118 of FIG. 10. FIG. 11A shows a side view of transfer key 118 comprising two support arms 134, 136 connected with each other at a connection point 138. A support element 140 is connected to the connection point 138, which is configured to support the model component 102 of the upper jaw. Support element 140 may comprise a further support arm 142 connected to the connection point 138. The support arm 142 may be connected with a bow-shaped support plate 144 comprising a plurality of protrusions 146. For example, the support plate 144 may comprise three protrusions 146 for a three-point support of model component 104 of the upper jaw. FIG. 11B shows a view from above of the transfer key 118 of FIG. 11A. The support arm 134 is shown as well as the further support arm 142, the bow-shaped support plate 144 with a plurality of protrusions 146. For example, three protrusions 146 are distributed on the support plate 144.

Alternatively, the transfer key 118 of FIG. 11A may be configured for supporting the model component 104 of the lower jaw. For example, the distribution and/or shape of the protrusions 146 may be configured to fit to a surface of the model component 104 of the lower jaw. The transfer key 118 may, e.g., be turned by 180° around an axis of rotation parallel to the first support arm 134 and attached to the articulator 106. Thus, the transfer key 118 may be attached to the articulator 106 similar to the situation shown in FIG. 10A, but with the first support arm 136 inserted into the second through-hole 132 of the incisal needle 108 and the second support arm 136 inserted into the first through-hole 130 of the incisal needle 108.

Figure 12A:
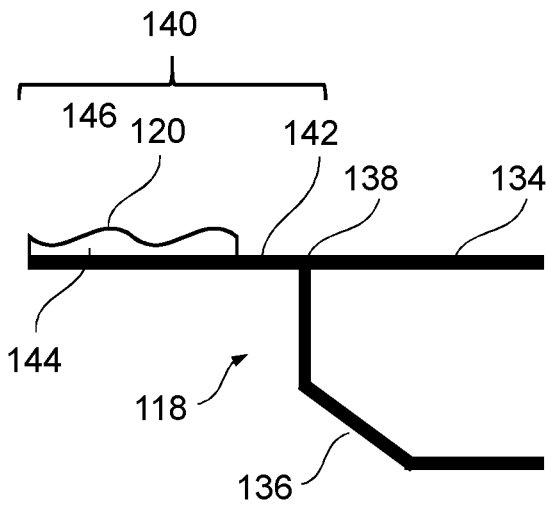
FIGS. 12A-12B show exemplary 3D virtual representations of a transfer key.
Figure 12B:
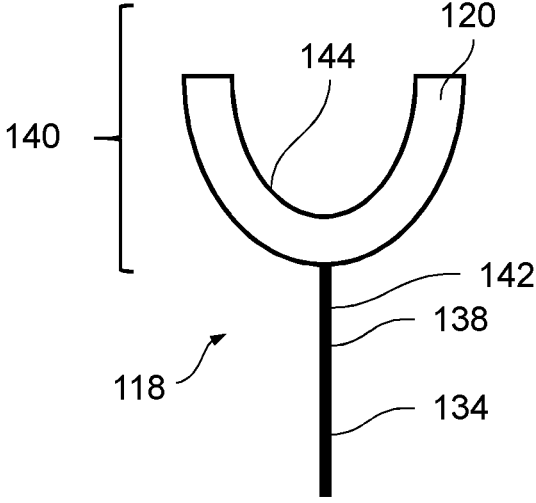

FIGS. 12A-12B show a further exemplary implementation of the transfer key 118 of FIG. 10. FIG. 12A shows an alternative implementation of the transfer key of FIG. 11A. The transfer key 118 of FIG. 12A is identical to the transfer key 118 of FIG. 11A except for the support plate 144. In case of FIG. 12A, the support plate 144 comprises no protrusions

146, but rather a support surface 120 which may be identical with the support surface 120 of the transfer key 118 shown in FIG. 3. FIG. 12B shows a view from above of the transfer key 118 of FIG. 12A. The support arm 134 is shown as well as the support plate 144 with the support surface 120, which may be identical to the support surface 120 of the transfer key 118 of FIG. 3.

Alternatively, the transfer key 118 of FIG. 12A may be configured for supporting the model component 104 of the lower jaw. For example, the shape of the support surface 120 may be configured to fit to a surface of the model component 104 of the lower jaw. The transfer key 118 may, e.g., be turned by 180° around an axis of rotation parallel to the first support arm 134 and attached to the articulator 106. Thus, the transfer key 118 may be attached to the articulator 106 similar to the situation shown in FIG. 10A, but with the first support arm 136 inserted into the second through-hole 132 of the incisal needle 108 and the second support arm 136 inserted into the first through-hole 130 of the incisal needle 108.

Figure 13A:
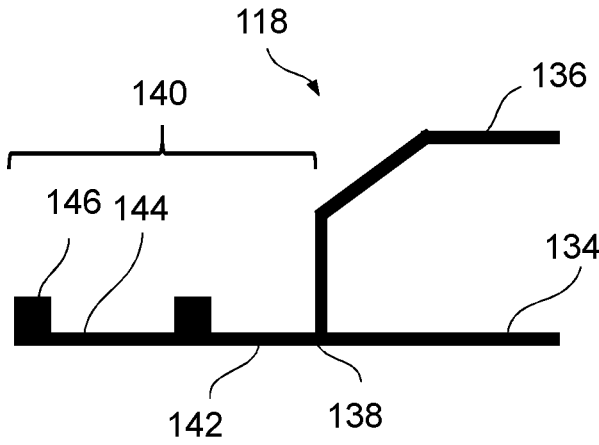
FIGS. 13A-13B show exemplary 3D virtual representations of transfer keys.
Figure 13B:
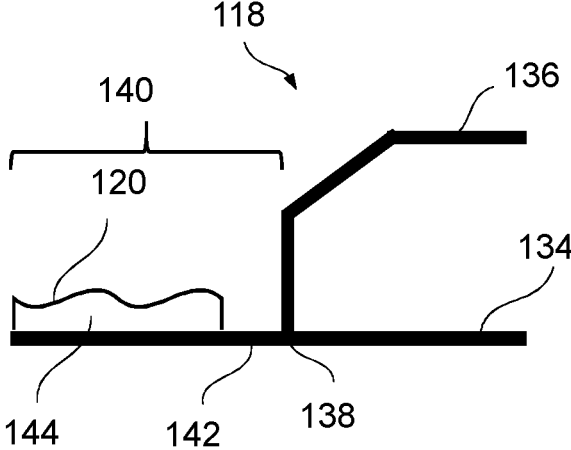

FIGS. 13A-13B show side views of further exemplary implementations of the transfer key 118. The transfer key 118 of FIG. 13A is configured for arranging the model component 104 of the lower jaw at the first position within the articulator 106. Like the transfer key 118 of FIG. 11A, the transfer key 118 of FIG. 13A comprises two support arms 134, 136 connected with each other at a connection point 138. A support element 140 is connected to the connection point 138, which is configured to support the model component 104 of the lower jaw. Support element 140 may comprise a further support arm 142 connected to the connection point 138. The support arm 142 may be connected with a bow-shaped support plate 144, e.g., as shown in FIG. 11B, comprising a plurality of protrusions 146. In case of FIG. 13A, the protrusions 146 are located on the same side of the support plate 144 as the second support arm 136, while in case of FIG. 11A, the protrusions 146 are located on the opposite side of the support plate 144. For example, the support plate 144 may comprise three protrusions 146 for a three-point support of model component 102 of the lower jaw.

FIG. 13B shows an alternative implementation of the transfer key 118 of FIG. 13A. The transfer key 118 of FIG. 13B is identical to the transfer key 118 of FIG. 12A except for the support surface 120 of the support plate 144. In case of FIG. 13B, the support plate 144 comprises a support surface 120 which may be identical with the support surface 120 of the transfer key 118 shown in FIG. 3. In case of FIG. 13B, the support surface 120 of the support plate 144 is located on the same side of the support plate 144 as the second support arm 136 for supporting model component 104 of the lower jaw, while in case of FIG. 12A, the support surface 120 of the support plate 144 is located on the opposite side of the support plate 144.

Figure 14:
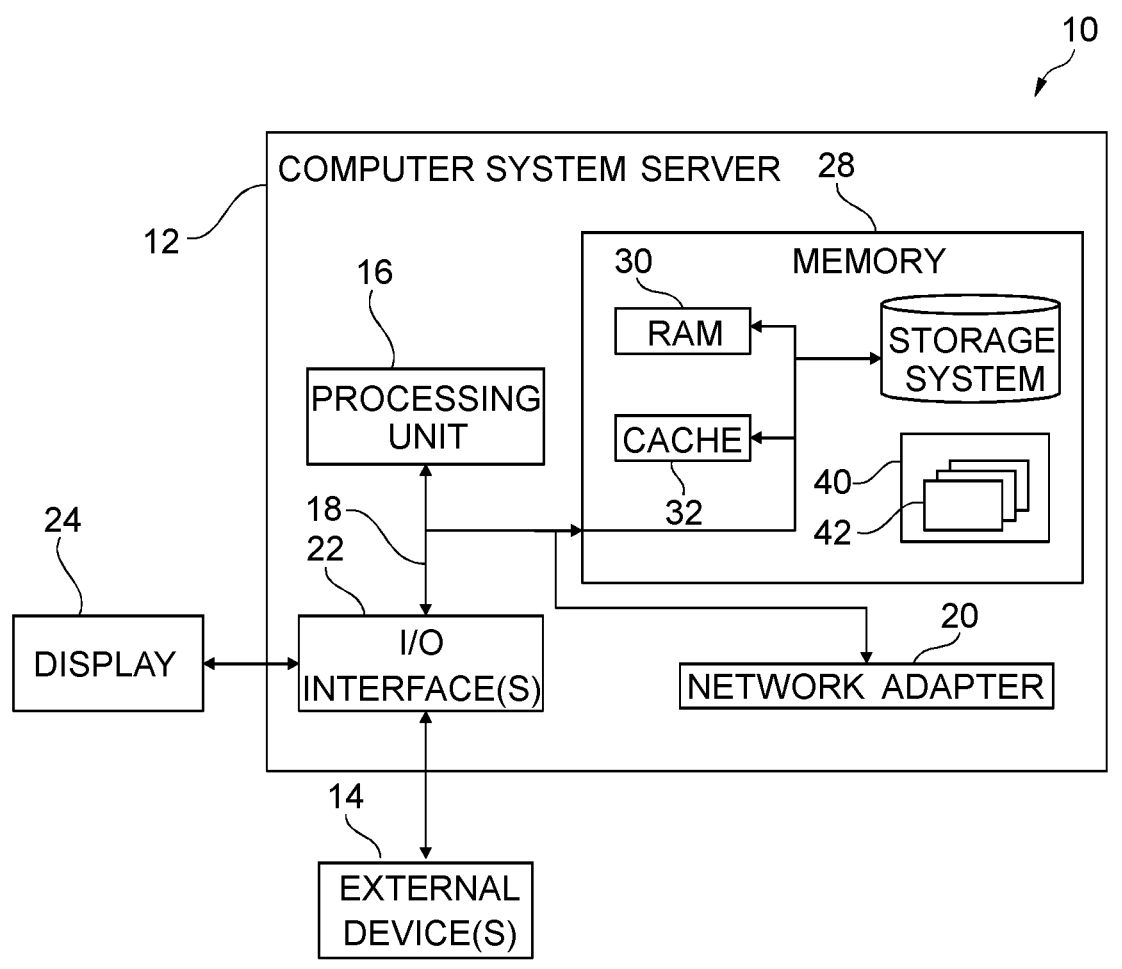
FIG. 14 shows an exemplary computer system for configurating a 3D virtual representation of a physical transfer key.

FIG. 14 shows a schematic diagram of an exemplary computer system 10 of a system 105 for configurating a patient individual physical transfer key. The transfer key may be usable for transferring a virtually defined first position of a three-dimensional (3D) virtual representation of a physical model of a patient's dentition, e.g., a model component of an upper and/or lower jaw, within a 3D virtual representation of a physical articulator to the physical model of the patient's dentition and the physical articulator. The computer system 10 may be operational with numerous other general purpose or special purpose computing system environments or configurations.

Computer system 10 may be described in the general context of computer system executable instructions, such as program modules comprising executable program instructions, being executable by the computer system 10. Generally, program modules may include routines, programs, objects, components, logic, data structures, and so on that perform particular tasks or implement particular abstract data types. Computer system 10 may be practiced in distributed computing environments where tasks are performed by remote processing devices that are linked through a communications network. In a distributed computing environment, program modules may be located in both local and remote computer system storage media including memory storage devices.

In FIG. 14, computer system 10 is shown in the form of a general-purpose computing device. The components of computer system 10 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 10 may comprise a variety of computer system readable storage media. Such media may be any available storage media accessible by computer system 10, and include both volatile and non-volatile storage media, removable and non-removable storage media.

A system memory 28 may include computer system readable storage media in the form of volatile memory, such as random-access memory (RAM) 30 and/or cache memory 32. Computer system 10 may further include other removable/non-removable, volatile/non-volatile computer system storage media. For example, storage system 34 may be provided for reading from and writing to a non-removable, non-volatile magnetic media also referred to as a hard drive. For example, a magnetic disk drive for reading from and writing to a removable, non-volatile magnetic disk, e.g., a floppy disk, and an optical disk drive for reading from or writing to a removable, non-volatile optical disk such as a CD-ROM, DVD-ROM or other optical storage media may be provided. In such instances, each storage medium may be connected to bus 18 by one or more data media interfaces. Memory 28 may include at least one program product having a set of program modules, e.g., at least one program module, configured to carry out the configuration of a 3D virtual representation of a patient individual physical transfer key.

Program 40 may have a set of one or more program modules 42 and by way of example be stored in memory 28. The program modules 42 may comprise an operating system, one or more application programs, other program modules, and/or program data. Each of the operating system, one or more application programs, other program modules, and program data or some combination thereof, may include an implementation of a networking environment. One or more of the program modules 42 may carry out the configuration of a 3D virtual representation of a patient individual physical transfer key.

Computer system 10 may further communicate with one or more external devices 14 such as a keyboard, a pointing device, like a mouse, and a display 24 enabling a user to interact with computer system 10. Such communication can occur via input/output (I/O) interfaces 22. Computer system 10 may further communicate with one or more networks such as a local area network (LAN), a general wide area network (WAN), and/or a public network, like the Internet, via network adapter 20. Network adapter 20 may communicate with other components of computer system 10 via bus 18. It should be understood that although not shown, other hardware and/or software components could be used in conjunction with computer system 10.

The computer system 10 shown in FIG. 14 may be configured for configuring a 3D virtual representation of a patient individual physical transfer key. The computer system 10 may be a standalone computer with no network connectivity that may receive data to be processed, such as scanned data of a patient's mouth and/or 3D virtual representations, i.e., a digital model, of a physical articulator and/or of a physical model of a patient's dentition through a local interface. The 3D virtual representation of the dentition model may, e.g., comprise a 3D virtual representation of a model component of at least a part of the patient's upper jaw and/or a 3D virtual representation of a model component of at least a part of the patient's lower jaw. Such operation may, however, likewise be performed using a computer system that is connected to a network such as a communications network and/or a computing network.

Figure 15:
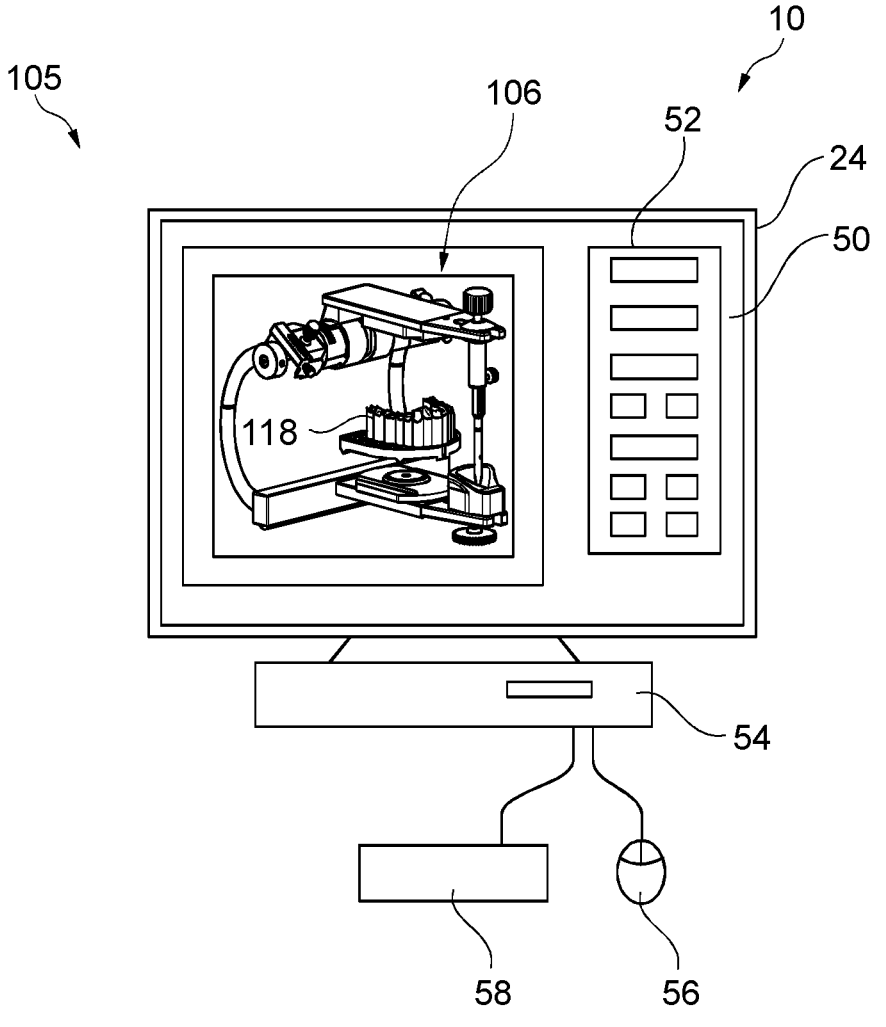
FIG. 15 shows an exemplary system for configurating a 3D virtual representation of a physical transfer key.

FIG. 15 shows an exemplary system 105 comprising computer system 10 for configuring a patient individual physical transfer key 118 using a 3D virtual representation of a physical articulator 106. The computer system 10 may for example be configured as shown in FIG. 14. The computer system 10 may comprise a hardware component 54 comprising one or more processors as well as a memory storing machine-executable program instructions. Execution of the program instructions by the one or more processors may cause the one or more processors to control the computer system 10 to configurate the patient individual physical transfer key 118. The computer system 10 may further comprise one or more input devices, like a keyboard 54 and a mouse 56, enabling a user to interact with the computer system 10. Furthermore, the computer system 10 may comprise one or more output devices, like a display 24 providing a user interface 50 with control elements 52 enabling the user to control the configuration of the patient individual transfer key 118 using the computer system 10. The 3D virtual representation of the patient individual transfer key 118 configurated using the computer system 10 may be shown on the user interface 50.

Figure 16:
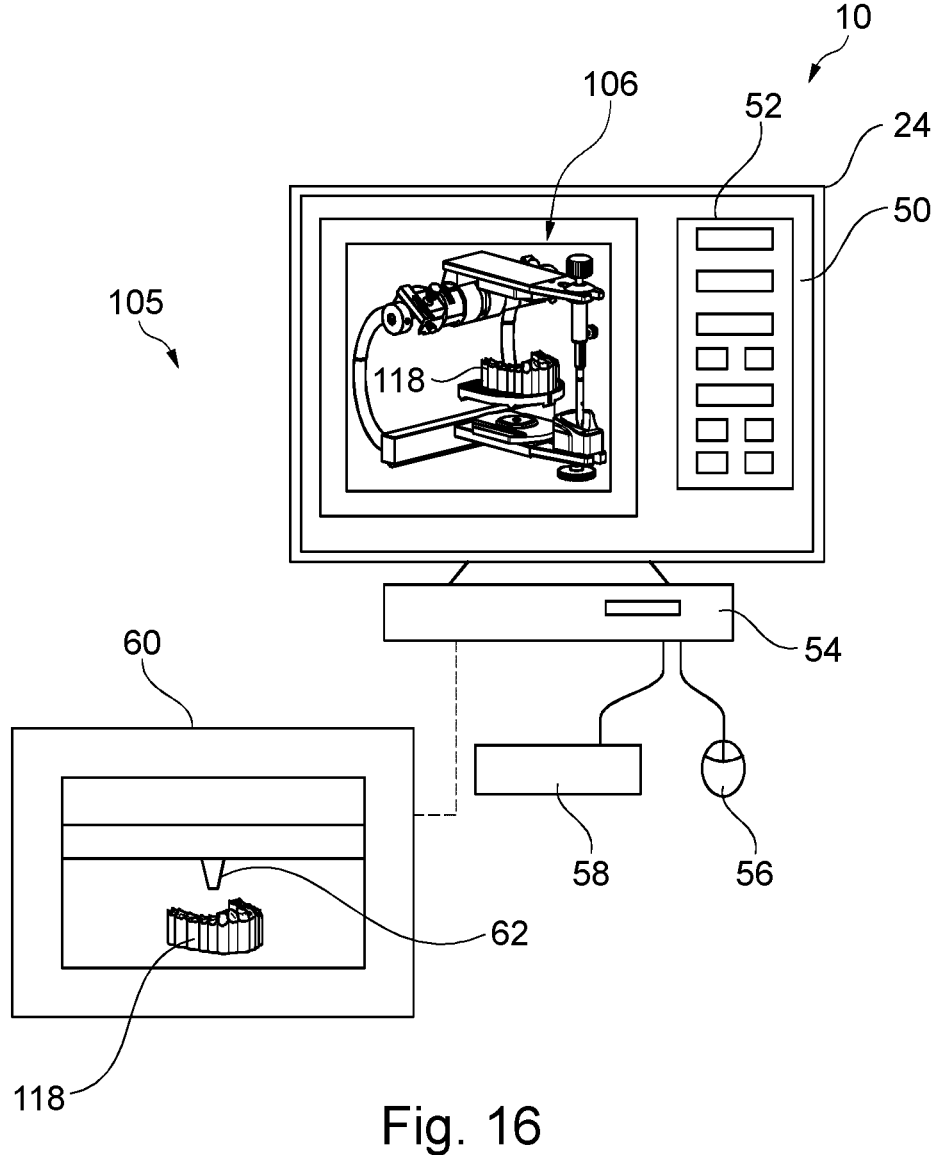
FIG. 16 shows an exemplary system for generating a physical transfer key.

FIG. 16 shows an exemplary system 105 for configurating and generating a patient individual transfer key 118. The system 105 may comprise the computer system 10 of FIG. 15. The computer system 10 may further be configured to control a manufacturing device in form of a 3D printer 60 for generating the patient individual physical transfer key 118 according to the 3D virtual representation of the patient individual physical transfer key 118 on the computer system 10. The 3D printer 60 may comprise a printing element 62 configured to print the patient individual physical transfer key 118 layer by layer.

Figure 17:
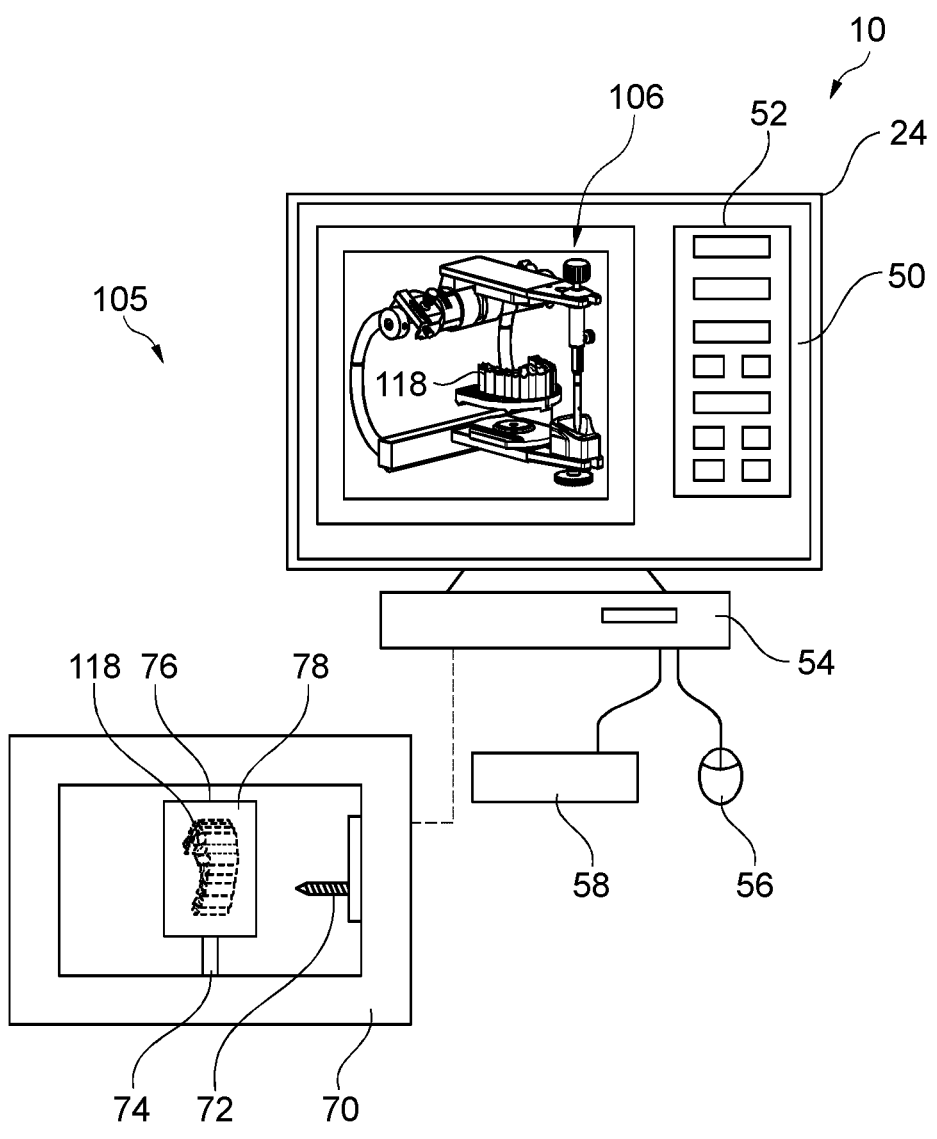
FIG. 17 shows an exemplary system for generating a physical transfer key.

FIG. 17 shows a further production system 105 for configurating and generating a patient individual transfer key 118. The system 105 may comprise the computer system 10 of FIG. 15. The computer system 10 may further be configured to control a manufacturing device in form of a machining device 70 configured to machining a blank 76 using one or more machining tools 72. The blank 76 of raw material 78 may be provided using a holding device 74 and cut into a desired final shape and size of the component to be produced, like the patient individual physical transfer key 118, using the one or more machining tools 72 for executing a controlled material-removal process. The machining tool 72 may for example be a milling tool.

Figure 18:
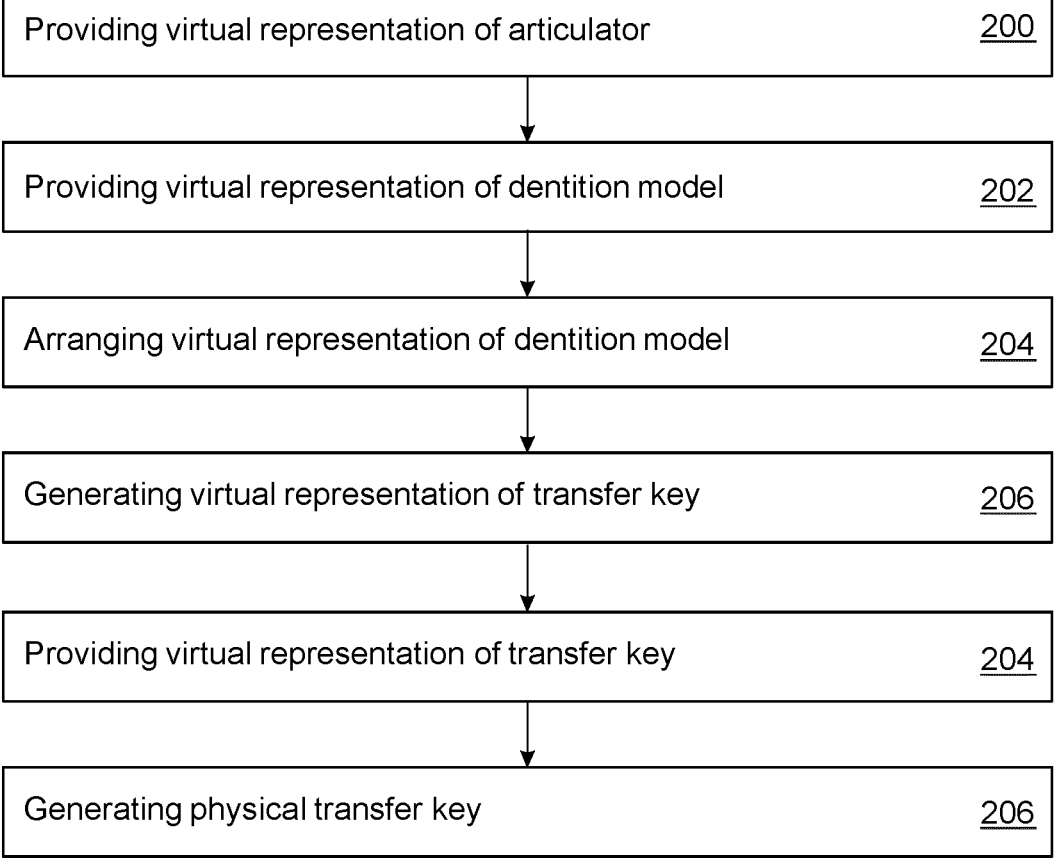
FIG. 18 shows a flowchart illustrating an exemplary method for configurating and generating a physical transfer key.

FIG. 18 shows a flowchart of an exemplary method for configurating a patient individual physical transfer key. The transfer key is configured for transferring a virtually defined first position of a 3D virtual representation of a physical model of a patient's dentition, e.g., a virtual 3D virtual representation of a model component of the upper or lower jaw, within a 3D virtual representation of a physical articulator to the physical model of the patient's dentition and the physical articulator.

In block 200, the 3D virtual representation of the physical articulator is provided. For example, the 3D virtual representation of the physical articulator used for configurating the transfer key may be selected from a plurality of 3D virtual representation of different physical articulators. Thus, the 3D virtual representation of the physical articulator may be selected, which will later on be used to check the physical dentition model. In block 202, the 3D virtual representation of the physical model of a patient's dentition is provided. The 3D virtual representation of the dentition model may comprise a 3D virtual representation of a model component of at least a part of the patient's upper jaw and/or a 3D virtual representation of a model component of at least a part of the patient's lower jaw. For example, only the model component of the upper jaw or the lower jaw is provided. For example, both the model component of the upper jaw and the lower jaw are provided.

In block 204, at least a first one of the 3D virtual representations of the model components of the dentition model is arranged at the first position. For example, the model component of the upper jaw or the lower jaw arranged. For example, both the model component of the upper jaw and the lower jaw are arranged. For arranging at least the first one of the 3D virtual representations of the model components within the articulator, e.g., digital position data measured with a digital facebow may be used.

In case both model components of the upper as well as the lower jaw are arranged within the 3D virtual representation of the physical articulator, e.g., for adjusting virtually the articulation of the 3D virtual representations of the dentition model, a first one of the 3D virtual representations of the model components may be selected. The adjusting the articulation may comprise adjusting the contact relationship of the occlusal surfaces of the upper and lower teeth when moving into and away from centric occlusion. Thus, a correct interdigitation of the teeth and an anatomically functional biting plane may be ensured for the 3D virtual representations of the dentition model. For example, the model component of the upper or the lower jaw may be selected for configurating the transfer key. The non-selected one of the 3D virtual representations of the model components may be neglected for the configuration of the of the transfer key and removed from within the 3D virtual representation of the physical articulator.

First and second support sections may be defined for supporting the dentition model, e.g., first one of the 3D virtual representations of the model components at the first position. The first support section may be a section of the 3D virtual representation of the articulator and the second support section may be a section of the first one of the 3D virtual representations of the model components of the dentition model. For example, the 3D virtual representation of the articulator may comprise a plurality of different first support sections, from which a first support section to be used to support the first model component may be selected.

In block 206, a 3D virtual representation of the physical transfer key is configured. The transfer key may be configured to be connected to the first support section of the articulator and to support the first one of the model components of the dentition model via the second support section. For example, the transfer key may be designed to bridge the gap between the two support sections. The transfer key may comprise a mounting face configured to be mounted onto the first support section of the articulator. The connection between the transfer key and the articulator may comprise one or more mounting elements. The mounting elements may be configured to generate a form-locking or a clamping connection between the transfer key and the articulator. The 3D virtual representation of the physical transfer key may further comprise a supporting surface for supporting the first model component at the second support section. For example, the shape of the supporting surface may be a negative of the shape of a surface of the second support section. Thus, a relative position of the first model component relative to the transfer key may be defined by the transfer key. The shape of the transfer key may, e.g., further depend on the selection of the support section to be used. In block 208, the 3D virtual representation of the physical transfer key may be provided for generating the physical transfer key and in block 210, the physical transfer key may be generated using the 3D virtual representation of the physical transfer key. For example, the physical transfer key may be generated using a 3D printing device or a machining device.

FIG. 19 shows a flowchart of an exemplary method for configurating a patient individual physical transfer key. Blocks 300 to 304 may be identical to block 200 to 204 of FIG. 18. In block 306, a 3D virtual representation of a physical connection element may be provided. For example, the 3D virtual representation of the connection element may be selected from a plurality of 3D virtual representations of different connection element. The plurality of 3D virtual representations may be articulator specific and comprise only 3D virtual representations of connection elements configured to be connected to the physical articulator for which the 3D virtual representations of the transfer key is configured. The different connection elements may be configured for being attached to different first support sections of the articulator. Thus, by selecting a connection element, the first support section to be used to support the first model component may be selected. For example, the size of the different connection elements may differ. For example, the height of the different connection elements may differ. Thus, e.g., a connection element may be selected thus that a gap between the first model component at the first position and the connection element has a predefined size and/or a size within a predefined range of sizes. By ensuring that the gape has a predefined size and/or a size within a predefined range of sizes, it may be ensured the transfer key bridging the gap has a predefined size and/or a size within a predefined range of sizes. In block 308, the 3D virtual representation of a physical connection element may be arranged on the first support surface of the articulator. The connection element may comprise a first mounting face configured to be mounted onto the first support section of the articulator. The connection between the connection element and the articulator may comprise one or more mounting elements. The mounting elements may be configured to generate a form-locking or a clamping connection between the connection element and the articulator.

Block 310 may be identical to block 206 of FIG. 18, in which the 3D virtual representation of the physical transfer key is configured. The transfer key may be configured to be connected to the first support section of the articulator via a physical connection element. Thus, the transfer key may be designed to bridge the gap between the connection element and the second support section of the first model component. The mounting face of the transfer key may be configured to be mounted onto the connection element. The connection element may comprise, e.g., mounting holes configured for receiving mounting pins distributed on the mounting surface of the transfer key. For example, the connection element may be configured as perforated plate comprising a plurality of holes, e.g., through-holes, as mounting holes. The 3D virtual representation of the physical transfer key may further comprise a supporting surface for supporting the first model component at the second support section. For example, the shape of the supporting surface may be a negative of the shape of a surface of the second support section. Thus, a relative position of the first model component relative to the transfer key may be defined by the transfer key. The shape of the transfer key may, e.g., further depend on the selection of the support section to be used. Block 312 and 314 may be identical to blocks 208 and 210 of FIG. 18.

The 3D virtual representation of the connection element used for configurating the transfer key may be a 3D virtual representation of a generic connection element, which is provided together with the physical articulator. The generic connection element may be configured to be used for dentition models of different patients, i.e., it may be independent of patient individual features of the transfer key and/or the first model component. For example, the generic connection element may comprise a plurality of mounting elements, like mounting holes. For the transfer key depending on its patient individual size and/or form mounting elements may be selected for mounting the transfer key on the connection element. For example, the transfer key may comprise a plurality of mounting pins configured to be inserted in selected mounting holes of the connection element. For example, a plurality of generic connection elements may be provided and the generic connection element to be used may be selected from the plurality of generic connection elements. The one or more generic connection elements may be assigned to the articulator and provided together with the articulator.

Alternatively, the 3D virtual representation of the connection element used for configurating the transfer key may be a 3D virtual representation of a patient individual connection element, i.e., the connection element may be configured and provided for an individual patient. For example, block 310 may comprise an adjusting of the connection element depending on the transfer key.

In case of a generic connection element, a plurality of generic physical connection elements may be provided, e.g., together with the physical articulator, independently of the configuration of the transfer key. For example, in case of a generic or a patient individual connection element the method may further comprise generating the respective connection element. In block 314, the physical connection element may be generated using the 3D virtual representation of the physical connection element. For example, the physical transfer key may be generated using a 3D printing device or a machining device. For example, a blank may be provided for generating the physical connection element, e.g., by milling using the machining device. For example, a prefabricated physical connection element may be provided and adjusted, e.g., by milling using the machining device.

Figure 20:
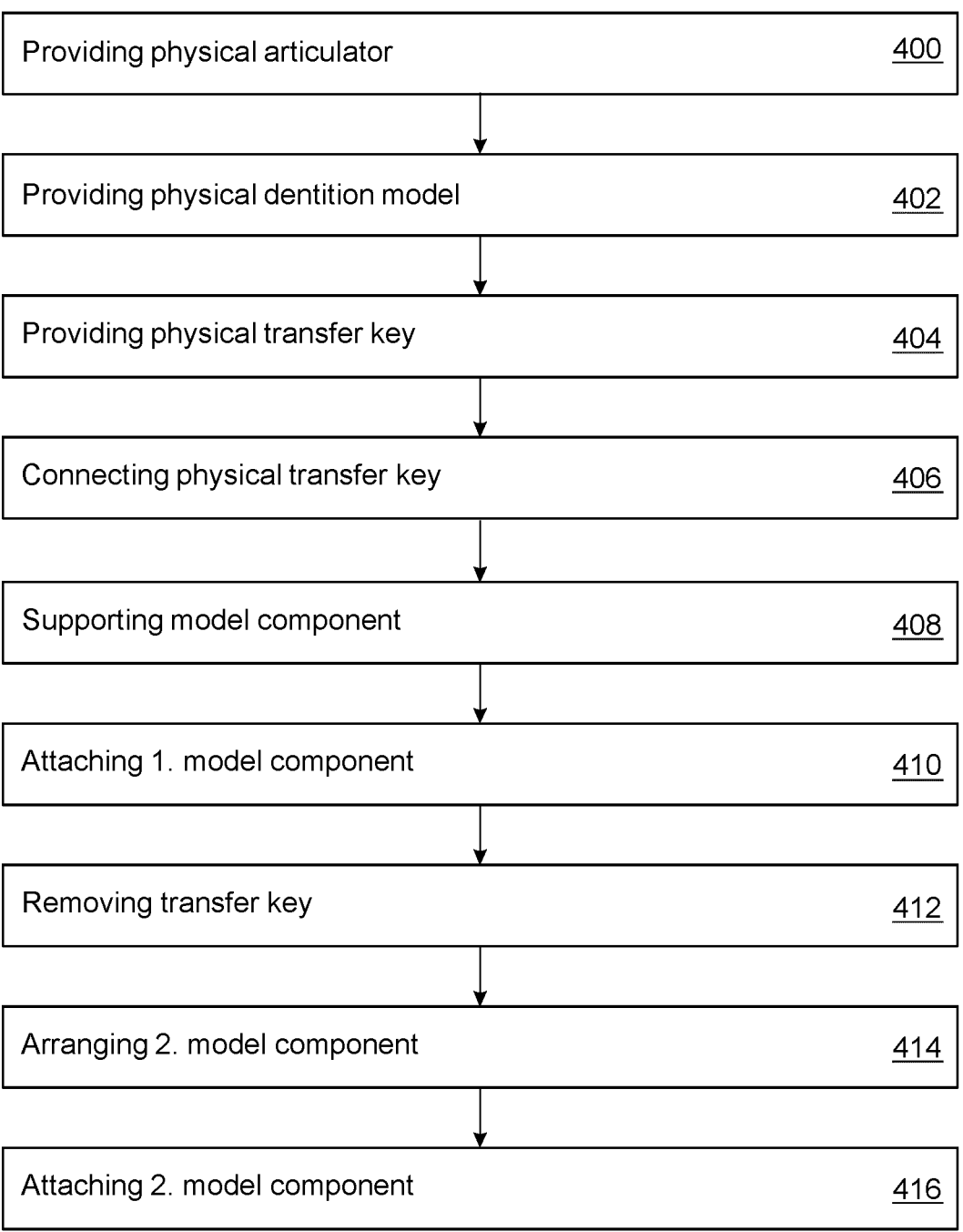
FIG. 20 shows a flowchart illustrating an exemplary method for using a physical transfer key.

FIG. 20 shows a flowchart illustrating an exemplary method for using a patient individual physical transfer key. In block 400, a physical articulator is provided. In block 402, a physical model of a patient's dentition is provided. The dentition model may, e.g., comprise model components of the patient's upper and lower jaws. In block 404, the patient individual physical transfer key is provided. For example, the patient individual physical transfer key may be configurated and generated using the method of FIG. 18. In block 406, the physical transfer key is connected to a support section of the physical articulator. The support section of the physical articulator is configured for supporting a first of the model components of the dentition model, e.g., the model component of the upper or the lower jaw. In block 408, the physical transfer key is used to support the first model components of the dentition model at the first position within the physical articulator. In block 410, the first model component is located at the first position within the articulator is attached to the articulator, e.g., using an adhesive. For example, plaster may be used as an adhesive to attach the first model component to the articulator. When the adhesive has set, the physical transfer key may be removed in block 412. The physical transfer key may, e.g., be removed to make room for the second model component. In block 414, the second model component is arranged at a second position relative to the first model component. For example, the occlusal relation between the teeth of the first and second component, i.e., the two jaws, may be used for arranging the second component. For example, an impression with the teeth of the upper and lower jaws may be used. Such an impression may, e.g., be generated using the 3D virtual representation of the dentition model. The 3D virtual representation of the dentition model may be positioned at the first position within the 3D virtual representation of the articulator. The 3D virtual representation of the impression may be generated such that it fills a gap between the teeth of the upper and lower jaw of the 3D virtual representation of the dentition model. 3D virtual representation of the impression may be used to generate the physical impression, e.g., by 3D printing or machining a blank. In block 416, the second model component is attached to the physical articulator, e.g., using an adhesive like plaster.

FIG. 21 shows a flowchart illustrating a further exemplary method for using a patient individual physical transfer key. The method of FIG. 21 is similar to the method of FIG. 20, but in addition uses a connection element. In block 500 a physical articulator is provided. The physical articulator may be provided in combination with one or more physical connection elements. Alternatively, a physical connection element may be provided independently in block 502, e.g., generated according to the method of FIG. 19. In case plurality of physical connection elements is provided with the physical articulator, the physical connection element may to be used may be selected from the plurality provided. For example, the physical connection element may be chosen, whose 3D virtual representation has been used for configurating the transfer key, e.g., according to the method of FIG. 19. In block 504, a physical model of a patient's dentition is provided. The dentition model may, e.g., comprise model components of the patient's upper and lower jaws. In block 506, the patient individual physical transfer key is provided. For example, the patient individual physical transfer key may be configured and generated using the method of FIG. 19. In block 508, the physical transfer key is connected to a support section of the physical articulator via the physical connection element. The physical connection element may be mounted onto the support section of the physical articulator and the physical transfer key may be connected to the connection element. The support section of the physical articulator is configured for supporting a first of the model components of the dentition model, e.g., the model component of the upper or the lower jaw. In block 510, the physical transfer key is used to support the first model components of the dentition model at the first position within the physical articulator. In block 512, the first model component is located at the first position within the articulator is attached to the articulator, e.g., using an adhesive. For example, plaster may be used as an adhesive to attach the first model component to the articulator. When the adhesive has set, the physical transfer key and the connection element may be removed in block 514. The physical transfer key and the connection element may, e.g., be removed to make room for the second model component. In block 516, the second model component is arranged at a second position relative to the first model component. For example, the occlusal relation between the teeth of the first and second component, i.e., the two jaws, may be used for arranging the second component. For example, an impression with the teeth of the upper and lower jaws may be used. Such an impression may, e.g., be generated using the 3D virtual representation of the dentition model. The 3D virtual representation of the dentition model may be positioned at the first position within the 3D virtual representation of the articulator. The 3D virtual representation of the impression may be generated such that it fills a gap between the teeth of the upper and lower jaw of the 3D virtual representation of the dentition model. 3D virtual representation of the impression may be used to generate the physical impression, e.g., by 3D printing or machining a blank. In block 518, the second model component is attached to the physical articulator, e.g., using an adhesive like plaster.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

As will be appreciated by one skilled in the art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable signal medium or a computer readable storage medium. A "computer-readable storage medium" as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid-state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example, a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

"Computer memory" or "memory" is an example of a computer-readable storage medium. Computer memory is any memory which is directly accessible to a processor. "Computer storage" or "storage" is a further example of a computer-readable storage medium. Computer storage is any non-volatile computer-readable storage medium. In some embodiments, computer storage may also be computer memory or vice versa.

A "processor" as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems.

The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object-oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, the program instructions can be executed on one processor or on several processors. In the case of multiple processors, they can be distributed over several different entities like clients, servers etc. Each processor could execute a portion of the instructions intended for that entity. Thus, when referring to a system or process involving multiple entities, the computer program or program instructions are understood to be adapted to be executed by a processor associated or related to the respective entity.

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further under stood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Possible advantageous embodiments may comprise the following combinations of features:

1. A method for configurating a patient individual physical transfer key for transferring a virtually defined first position of a three-dimensional (3D) virtual representation of a physical model of a patient's dentition within a 3D virtual representation of a physical articulator to the physical model of the patient's dentition and the physical articulator, the method comprising:

providing the 3D virtual representation of the physical articulator, providing the 3D virtual representation of the physical model of a patient's dentition, the 3D virtual representation of the dentition model comprising a 3D virtual representation of a model component of at least a part of the patient's upper jaw and a 3D virtual representation of a model component of at least a part of the patient's lower jaw, arranging a first one of the 3D virtual representations of the model components of the dentition model at the first position, wherein first and second support sections are defined for supporting the dentition model at the first position, the first support section being a section of the 3D virtual representation of the articulator and the second support section being a section of the first one of the 3D virtual representations of the model components of the dentition model, generating a 3D virtual representation of the physical transfer key, the transfer key being configured for being connected to the first support section of the articulator and supporting the first one of the model components of the dentition model via the second support section, providing the 3D virtual representation of the physical transfer key for generating the physical transfer key.

2. The method of any of the previous items, wherein the providing of the 3D virtual representation of the physical articulator comprises selecting the respective 3D virtual representation from a set of 3D virtual representations of a plurality of different physical articulators.

3. The method of any of the previous items, wherein the method further comprises generating the physical transfer key using the 3D virtual representation of the physical transfer key.

4. The method of item 3, wherein the physical transfer key is generated using a 3D printing device.

5. The method of any of the previous items 3 to 4, wherein the method further comprises:

providing the physical articulator, providing the physical model of a patient's dentition, connecting the physical transfer key to the first support section of the physical articulator, supporting the first one of the model components of the dentition model at the first position using the physical transfer key connected to the physical articulator, attaching the first one of the model components of the dentition model located at the first position to the physical articulator, removing the physical transfer key.

6. The method of item 5, wherein the method further comprises:

arranging the second one of the model components of the dentition model at a second position relative to the first one of the model components of the dentition model, attaching the second one of the model components of the dentition model located at the second position to the physical articulator.

7. The method of any of the previous items, wherein the physical transfer key is configured to be connected to the first support section of the physical articulator directly.

8. The method of any of the previous items, wherein the physical transfer key is configured to be connected to the first support section of the physical articulator via a physical connection element, wherein the method further comprises providing a 3D virtual representation of the physical connection element, wherein 3D virtual representation of the physical connection element is used for generating the 3D virtual representation of the physical transfer key.

9. The method of item 8, wherein the method further comprises generating the physical connection element using the 3D virtual representation of the connection element.

10. The method of item 9, wherein the physical connection element is generated using a 3D printing device.

11. The method of any of the previous items 8 to 10, wherein the physical connection element is a generic connection element independent of the individual patient's dentition model and adapted for usage with the physical articulator.

12. The method of any of the previous items 8 to 10, wherein the physical connection element is a patient individual connection element.

13. A system for configuring a patient individual physical transfer key for transferring a virtually defined first position of a three-dimensional (3D) virtual representation of a physical model of a patient's dentition within a 3D virtual representation of a physical articulator to the physical model of the patient's dentition and the physical articulator, the system comprising a computer device with a processor operatively coupled to a computer-readable storage medium storing computer-readable program instructions which, when executed by the processor, cause the processor to control the system to:

provide the 3D virtual representation of the physical articulator, provide the 3D virtual representation of the physical model of a patient's dentition, the 3D virtual representation of the dentition model comprising a 3D virtual representation of a model component of at least a part of the patient's upper jaw and a 3D virtual representation of a model component of at least a part of the patient's lower jaw, arrange a first one of the 3D virtual representations of the model components of the dentition model at the first position, wherein first and second support sections are defined for supporting the dentition model at the first position, the first support section being a section of the 3D virtual representation of the articulator and the second support section being a section of the first one of the 3D virtual representations of the model components of the dentition model, generate a 3D virtual representation of the physical transfer key, the transfer key being configured for being connected to the first support section of the articulator and supporting the first one of the model components of the dentition model via the second support section, provide the 3D virtual representation of the physical transfer key for generating the physical transfer key.

14. The system of item 13, wherein the system further comprises a manufacturing device for generating the physical transfer key using the 3D virtual representation of the physical transfer key.

15. The system of item 14, wherein the manufacturing device comprises a 3D printing device for generating the physical transfer key.

16. A computer program product comprising a non-volatile computer-readable storage medium having computer-readable program instructions embodied therewith for configurating a patient individual physical transfer key for transferring a virtually defined first position of a three-dimensional (3D) virtual representation of a physical model of a patient's dentition within a 3D virtual representation of a physical articulator to the physical model of the patient's dentition and the physical articulator, wherein execution of the computer-readable program instructions by a processor causes the processor to control a computer device to:

provide the 3D virtual representation of the physical articulator, provide the 3D virtual representation of the physical model of a patient's dentition, the 3D virtual representation of the dentition model comprising a 3D virtual representation of a model component of at least a part of the patient's upper jaw and a 3D virtual representation of a model component of at least a part of the patient's lower jaw, arrange a first one of the 3D virtual representations of the model components of the dentition model at the first position, wherein first and second support sections are defined for supporting the dentition model at the first position, the first support section being a section of the 3D virtual representation of the articulator and the second support section being a section of the first one of the 3D virtual representations of the model components of the dentition model, generate a 3D virtual representation of the physical transfer key, the transfer key being configured for being connected to the first support section of the articulator and supporting the first one of the model components of the dentition model via the second support section, provide the 3D virtual representation of the physical transfer key for generating the physical transfer key.

17. The computer program product of item 16, wherein execution of the computer-readable program instructions by a processor further causes the processor to control a manufacturing device communicatively connected to the computer device to generate the physical transfer key using the 3D virtual representation of the physical transfer key.

18. The computer program product of item 17, wherein the manufacturing device comprises a 3D printing device for generating the physical transfer key.

19. A patient individual physical transfer key for transferring a virtually defined first position of a three-dimensional (3D) virtual representation of a physical model of a patient's dentition within a 3D virtual representation of a physical articulator to the physical model of the patient's dentition and the physical articulator, wherein the physical transfer key is configured for being connected to a first support section, the first support section being a support section of the physical articulator intended for supporting a model component of the dentition model of at least a part of the patient's jaw, wherein the physical transfer key is further configured for supporting the model component of the dentition model at the first position via a second support section, the second support section being a support section of the model component.

LIST OF REFERENCE NUMERALS 10 computer system
14 external device
16 processing unit
18 bus
20 network adapter
22 I/O interface
24 display
28 memory
30 RAM
32 cache
34 storage system
40 program
42 program module
50 user interface
52 control elements
54 hardware device
56 keyboard
58 mouse
60 3D printer
62 printing element
70 machining device
72 machining tool
74 holding device
76 blank
78 raw material
100 dentition model
102 model of the upper jaw
104 model of the lower jaw
105 system
106 articulator
108 incisal needle
110 attachment section
112 attachment section
114 occlusion plane
116 connection element
117 mounting hole
118 transfer key
120 support surface
122 mounting surface
124 surface of model component 125 surface of model component
130 through-hole
132 through-hole
134 support arm
136 support arm
138 connection point
140 support element
142 support arm
144 support plate
146 protrusion
D distance

The invention claimed is:

1. A method for configurating a patient individual physical transfer key for transferring a virtually defined first position of a three-dimensional (3D) virtual representation of a physical model of a patient's dentition within a 3D virtual representation of a physical articulator to the physical model of the patient's dentition and the physical articulator, the method comprising:

providing the 3D virtual representation of the physical articulator, providing the 3D virtual representation of the physical model of a patient's dentition, the 3D virtual representation of the dentition model comprising a 3D virtual representation of a model component of at least a part of the patient's upper jaw and a 3D virtual representation of a model component of at least a part of the patient's lower jaw, arranging a first one of the 3D virtual representations of the model components of the dentition model at the first position, wherein first and second support sections are defined for supporting the dentition model at the first position, the first support section being a section of the 3D virtual representation of the articulator and the second support section being a section of the first one of the 3D virtual representations of the model components of the dentition model, generating a 3D virtual representation of the physical transfer key, the transfer key being configured for being connected to the first support section of the articulator and supporting the first one of the model components of the dentition model via the second support section, providing the 3D virtual representation of the physical transfer key for generating the physical transfer key, generating the physical transfer key using the 3D virtual representation of the physical transfer key, providing the physical articulator, providing the physical model of a patient's dentition, connecting the physical transfer key to the first support section of the physical articulator, supporting the first one of the model components of the dentition model at the first position using the physical transfer key connected to the physical articulator, attaching the first one of the model components of the dentition model located at the first position to the physical articulator, and removing the physical transfer key;

after the removal of the physical transfer key, arranging the second one of the model components of the dentition model at a second position relative to the first one of the model components of the dentition model, and attaching the second one of the model components of the dentition model located at the second position to the physical articulator.

2. The method of claim 1, wherein the physical transfer key is generated using a 3D printing device.

3. The method of claim 1, wherein the providing of the 3D virtual representation of the physical articulator comprises selecting the respective 3D virtual representation from a set of 3D virtual representations of a plurality of different physical articulators.

4. The method of claim 1, wherein the physical transfer key is configured to be connected to the first support section of the physical articulator directly.

5. The method of claim 1, wherein the physical transfer key is configured to be connected to the first support section of the physical articulator via a physical connection element, wherein the method further comprises providing a 3D virtual representation of the physical connection element, wherein 3D virtual representation of the physical connection element is used for generating the 3D virtual representation of the physical transfer key.

6. The method of claim 5, wherein the method further comprises generating the physical connection element using the 3D virtual representation of the connection element.

7. The method of claim 6, wherein the physical connection element is generated using a 3D printing device.

8. The method of claim 5, wherein the physical connection element is a generic connection element independent of the individual patient's dentition model and adapted for usage with the physical articulator.

9. The method of claim 5, wherein the physical connection element is a patient individual connection element.

*   *   *   *   *